United States Patent
Ohyama et al.

(10) Patent No.: US 9,091,859 B2
(45) Date of Patent: Jul. 28, 2015

(54) DISPLAY APPARATUS AND VARIABLE LENS ARRAY

(75) Inventors: Tsuyoshi Ohyama, Tokyo (JP); Daisuke Takama, Kanagawa (JP)

(73) Assignee: Japan Display Inc., Tokyo (JP)

( * ) Notice: Subject to any disclaimer, the term of this patent is extended or adjusted under 35 U.S.C. 154(b) by 295 days.

(21) Appl. No.: 13/480,186

(22) Filed: May 24, 2012

(65) Prior Publication Data
US 2012/0307169 A1 Dec. 6, 2012

(30) Foreign Application Priority Data
Jun. 3, 2011 (JP) .................................. 2011-125565

(51) Int. Cl.
| | |
|---|---|
| G02F 1/139 | (2006.01) |
| G02B 27/22 | (2006.01) |
| H04N 13/04 | (2006.01) |
| G02F 1/29 | (2006.01) |
| G02F 1/1337 | (2006.01) |

(52) U.S. Cl.
CPC .............. *G02B 27/2214* (2013.01); *G02F 1/29* (2013.01); *H04N 13/0404* (2013.01); *G02F 1/133788* (2013.01); *G02F 2001/294* (2013.01)

(58) Field of Classification Search
CPC ........... G02B 27/2214; H04N 13/0402; H04N 13/0404; H04N 13/0454
USPC ............................................. 349/15, 155–157
See application file for complete search history.

(56) References Cited

U.S. PATENT DOCUMENTS

2010/0157181 A1* 6/2010 Takahashi ....................... 349/33

FOREIGN PATENT DOCUMENTS

| JP | HEI 07-072445 | 3/1995 |
|---|---|---|
| JP | 07-318912 | 12/1995 |
| JP | 2001-194690 | 7/2001 |
| JP | 2005-274847 | 10/2005 |
| JP | 2010-160385 | 7/2010 |

OTHER PUBLICATIONS

Japanese Office Action issued Apr. 15, 2014 in corresponding Japanese Patent Application No. 2011-125565.

* cited by examiner

*Primary Examiner* — Thanh-Nhan P Nguyen
(74) *Attorney, Agent, or Firm* — K&L Gates LLP

(57) ABSTRACT

A display apparatus includes: a display unit that displays a two-dimensional image; and a variable lens array disposed to face the display unit, wherein the variable lens array includes a first substrate having a transparent first common electrode, a second substrate having a transparent second common electrode, and a liquid crystal layer disposed between the first substrate and the second substrate and forming liquid crystal lens columns, the liquid crystal layer is processed in such a way that liquid crystal molecules are so oriented that each of the liquid crystal lens columns produces refracting power in a state in which no potential difference is present between the first common electrode and the second common electrode, and a voltage applied between the first common electrode and the second common electrode controls the refracting power of each of the liquid crystal lens columns.

5 Claims, 17 Drawing Sheets

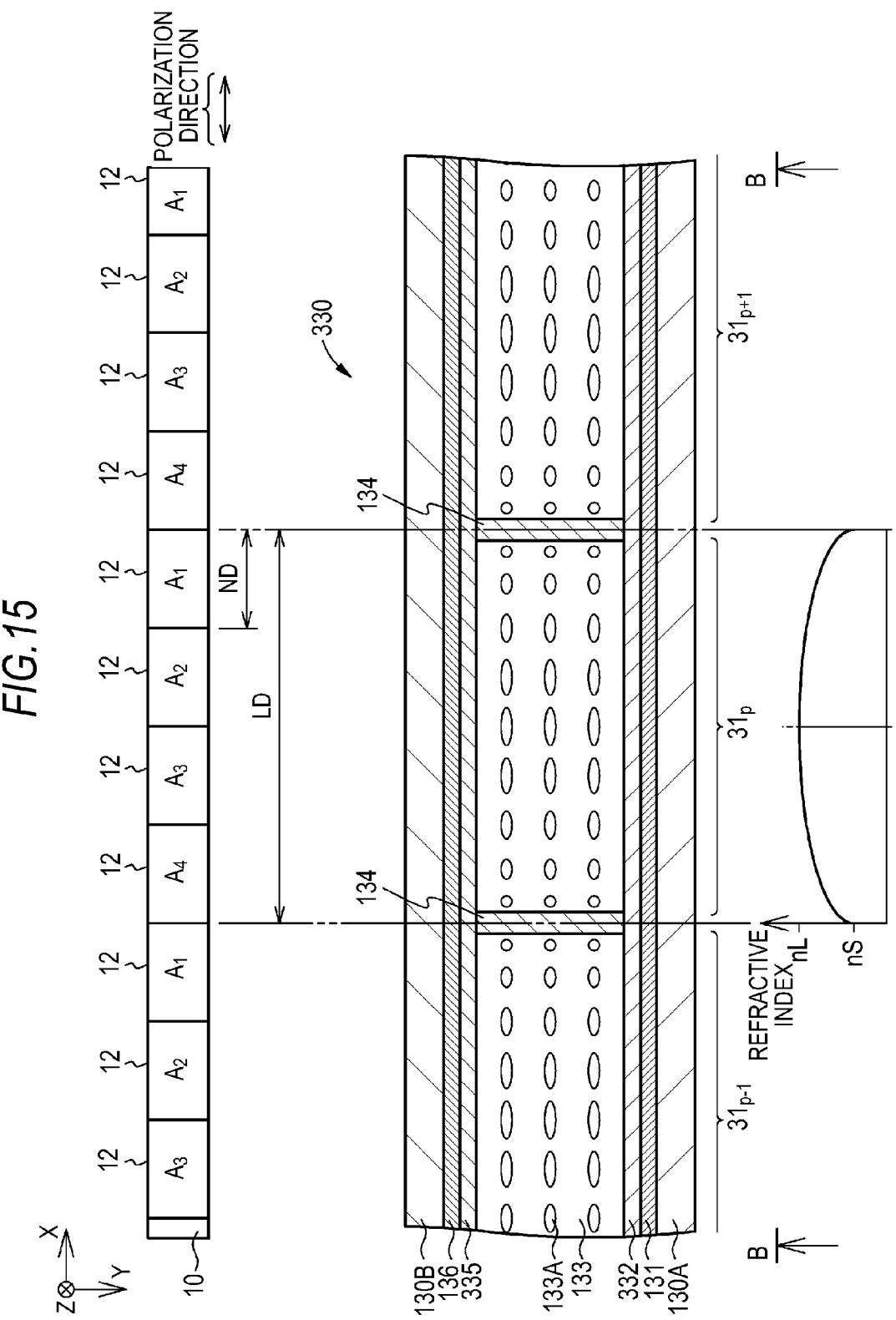

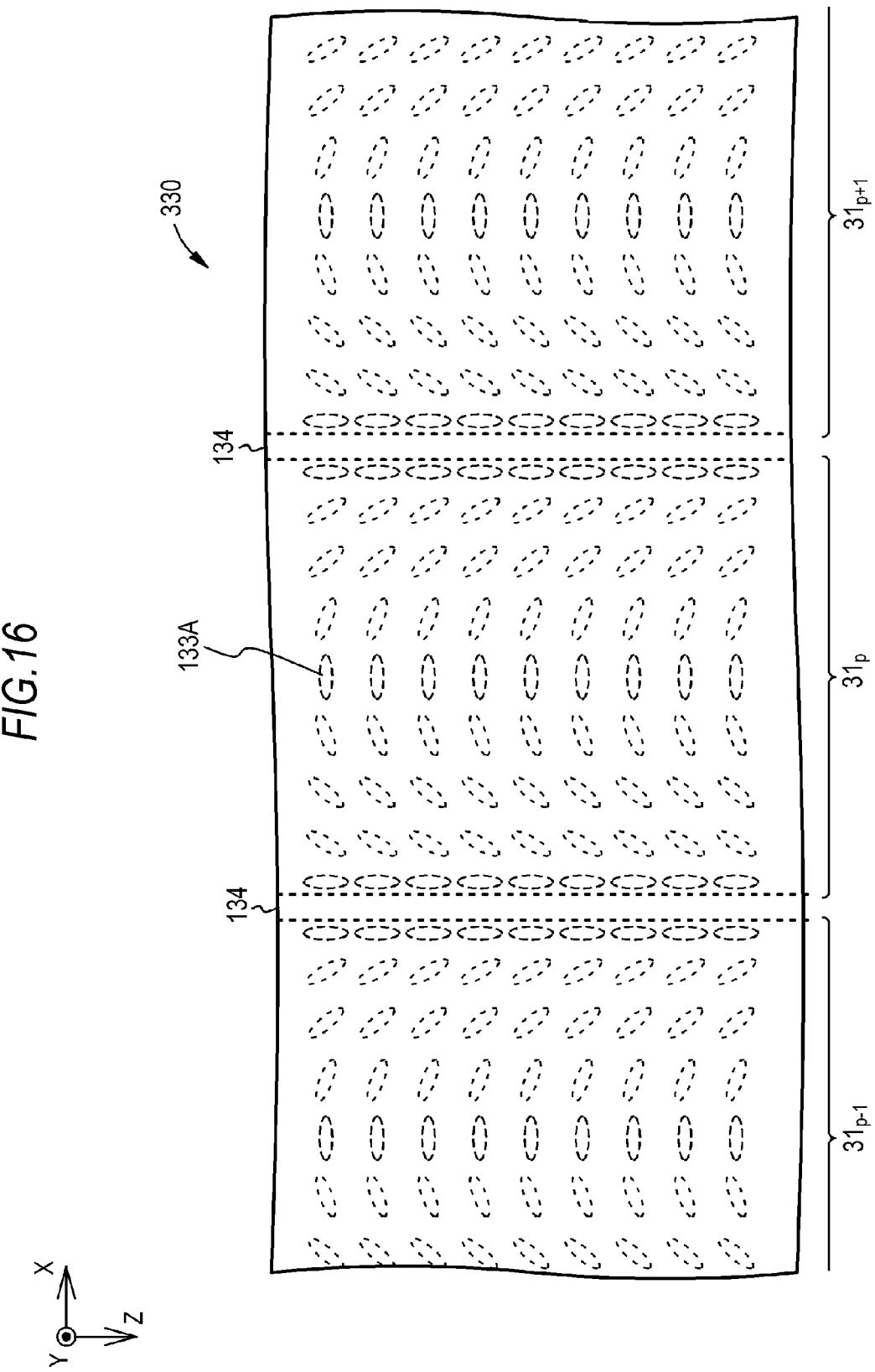

DISPLAY APPARATUS AND VARIABLE LENS ARRAY

CROSS REFERENCES TO RELATED APPLICATIONS

The present application claims priority to Japanese Priority Patent Application JP 2011-125565 filed in the Japan Patent Office on Jun. 3, 2011, the entire content of which is hereby incorporated by reference.

BACKGROUND

The present disclosure relates to a variable lens array. The present disclosure also relates to a display apparatus including the variable lens array.

There have been a variety of known display apparatus capable of displaying images for a plurality of viewpoints, for example, displaying images having parallax therebetween for stereoscopic vision. An example of a display apparatus of this type under development toward commercialization is a combination of a lenticular lens or any other suitable lens array and a display unit that displays two-dimensional images.

FIGS. 17A and 17B are conceptual diagrams showing the operation of a display apparatus having a lens array formed of lens columns disposed between a display unit and an image viewer.

A group of light rays emitted from a group of pixels labeled with reference characters R1, R3, R5, R7, and R9 reach a viewpoint 2, as shown in FIG. 17A. Similarly, a group of light rays emitted from a group of pixels labeled with reference characters L2, L4, L6, L8, and L10 reach a viewpoint 1, as shown in FIG. 17B. In a position from the display unit set apart by a predetermined distance, an image at the viewpoint 1 and an image at the viewpoint 2 are thus viewed independently.

When the left and right eyes of the image viewer are located at the viewpoints 1 and 2 respectively, and the group of pixels labeled with reference characters L2, L4, L6, L8, and L10 and the group of pixels labeled with reference characters R1, R3, R5, R7, and R9 display an image for the left eye and an image for the right eye respectively, the image viewer recognizes the images stereoscopically.

On the other hand, it is preferable for such a display apparatus capable of stereoscopic vision to be also capable of readily displaying regular images (two-dimensional images). In other words, a display apparatus of this type is desirably configured to be capable of switching a display mode between a stereoscopic image display mode and a regular image display mode. When the lens columns of the lens array have variable refracting power, the stereoscopic image display mode can be switched to the regular image display mode and vice versa.

For example, JP-A-7-72445 proposes a variable lens array capable of changing the refracting power of each lens column, as shown in FIG. 2 in JP-A-7-72445. The variable lens array described in JP-A-7-72445 has a structure in which a liquid crystal layer is disposed between a pair of transparent substrates each having a transparent electrode. In the variable lens array having the structure described above, each lens column is formed of a gradient index lens made of a liquid crystal material (hereinafter sometimes simply referred to as liquid crystal GRIN lens), and the refracting power of the lens column can be changed by changing the voltage between the pair of the substrates.

SUMMARY

In the variable lens array shown in FIG. 2 in JP-A-7-72445, to control the refractive index gradient in the liquid crystal layer, it is necessary to divide the electrode on at least one of the substrates, for example, into fine stripe-shaped electrodes and control the value of the voltage applied to each predetermined group of the electrodes. The configuration of the lens and the control of the voltage are thus complicated.

It is therefore desirable to provide a variable lens array that does not have divided electrodes, has a simple configuration, and is simply controlled. It is also desirable to provide a display apparatus including the variable lens array.

An embodiment of the present disclosure is directed to a display apparatus including a display unit that displays a two-dimensional image, and a variable lens array disposed to face the display unit, wherein the variable lens array includes a first substrate having a transparent first common electrode, a second substrate having a transparent second common electrode, and a liquid crystal layer disposed between the first substrate and the second substrate and forming liquid crystal lens columns, the liquid crystal layer is processed in such a way that liquid crystal molecules are so oriented that each of the liquid crystal lens columns produces refracting power in a state in which no potential difference is present between the first common electrode and the second common electrode, and a voltage applied between the first common electrode and the second common electrode controls the refracting power of each of the liquid crystal lens columns.

Another embodiment of the present disclosure is directed to a variable lens array including a first substrate having a transparent first common electrode, a second substrate having a transparent second common electrode, and a liquid crystal layer disposed between the first substrate and the second substrate, wherein the liquid crystal layer is processed in such a way that liquid crystal molecules are so oriented that each liquid crystal lens column produces refracting power in a state in which no voltage is applied between the first common electrode and the second common electrode, and a voltage applied between the first common electrode and the second common electrode controls the refracting power of each of the liquid crystal lens columns.

In the variable lens array according to the embodiments of the present disclosure or the variable lens array that forms the display apparatus according to the embodiment of the present disclosure, the liquid crystal layer is processed in such a way that that the liquid crystal molecules are so oriented that each of the liquid crystal lens columns produces refracting power in a state in which no potential difference is present between the first common electrode and the second common electrode. It is therefore not necessary to divide any of the electrodes in order to control the refractive index gradient in the liquid crystal layer or control the applied voltage on an electrode group basis. For example, when the same voltage is applied to the first common electrode and the second common electrode, the variable lens array functions as a lenticular lens. Further, when a potential difference of at least a certain magnitude is applied between the first common electrode and the second common electrode, the variable lens array substantially functions as a simple transparent substrate. The variable lens array according to one of the embodiments of the present disclosure can be configured and controlled in a simple manner.

Additional features and advantages are described herein, and will be apparent from the following Detailed Description and the figures.

BRIEF DESCRIPTION OF THE FIGURES

FIG. 15 is a diagrammatic cross-sectional view of part of a variable lens array and part of a display unit in a third embodiment;

FIG. 16 describes the orientation of liquid crystal molecules and is a diagrammatic plan view of the variable lens array viewed in the direction B-B shown in FIG. 15.

DETAILED DESCRIPTION

Figure 1:
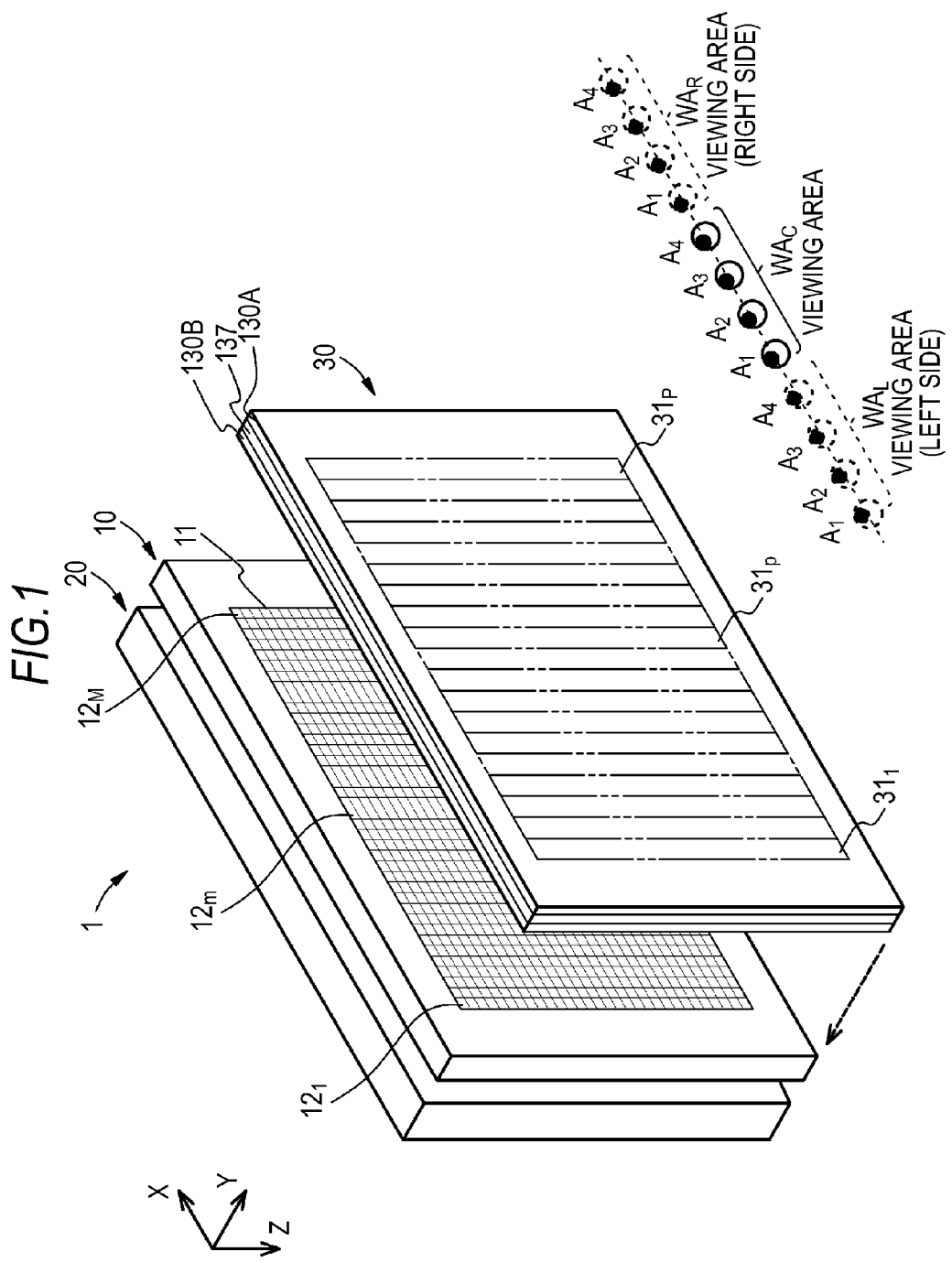
FIG. 1 is a diagrammatic exploded, perspective view of a display apparatus used in a first embodiment.

The present disclosure will be describe below based on embodiments with reference to the drawings. The present disclosure is not limited to the embodiments, and a variety of numeric values and materials in the embodiments are presented by way of example. In the following description, the same elements or elements having the same functions have the same reference characters, and no redundant description will be made. The description will be made in the following order.

1. Overall description of display apparatus and variable lens array according to embodiments of present disclosure
2. First embodiment
3. Second embodiment
4. Third embodiment (others)

Overall Description of Display Apparatus and
Variable Lens Array According to Embodiments of
Present Disclosure In a variable lens array according to the embodiments of the present disclosure or a variable lens array used in a display apparatus according to the embodiments of the present disclosure (these variable lens arrays are hereinafter sometimes simply referred to as variable lens arrays according to the embodiments of the present disclosure), to nullify refracting power of each liquid crystal lens column, a voltage is so applied between a first common electrode and a second common electrode that liquid crystal molecules in a liquid crystal layer are oriented in a fixed direction. Further, since the liquid crystal material is degraded when a DC voltage is continuously applied to the liquid crystal layer, the variable lens array may be so driven that the polarity of the voltage between the first common electrode and the second common electrode is sequentially reversed, as in a typical liquid crystal display panel.

In the variable lens array having the preferred configuration described above according to the embodiments of the present disclosure, an orientation film is formed on at least one of the surface of a first substrate that faces the liquid crystal layer and the surface of a second substrate that faces the liquid crystal layer, and the orientation film orients the liquid crystal molecules in such a way that each liquid crystal lens column produces refracting power in a state in which no potential difference is present between the first common electrode and the second common electrode. In this case, the orientation characteristics of the orientation film are controlled by light irradiation.

For example, when a film made of a polymer to which a photochemically reactive residue is bonded is irradiated with non-polarized light, the photochemical reaction in molecules arranged in the direction in which the light travels differs from the photochemical reaction in the other molecules, resulting in anisotropy in the orientation of the molecules. Alternatively, when the film made of a polymer to which a photochemically reactive residue is bonded is irradiated with linearly polarized light, a selective reaction constrained along the polarization axis occurs, resulting in anisotropy in the orientation of the molecules. In view of the fact described above, the orientation characteristics of the orientation film made of the polymer material can be controlled by, when the film is irradiated with non-polarized light, setting the direction in which the light travels as appropriate, whereas by, when the film is irradiated with linearly polarized light, using a mask or any other suitable component that controls the direction of the polarization axis as appropriate. The polymer material can, for example, be polyester, polyamide, polyimide, or any other suitable known material.

In the variable lens array having the variety of preferred configurations described above according to the embodiments of the present disclosure, which forms optical lenses, the liquid crystal layer needs to be much thicker than a liquid crystal layer in a typical liquid crystal display panel. For example, the first substrate and the second substrate can be set apart from each other by a predetermined distance by providing spherical spacers distributed between the substrates so that the liquid crystal layer is maintained to have a predetermined thickness. In this case, however, the diameter of the spacers is not negligible with respect to the pixel interval, possibly resulting in degradation in image quality. It is therefore preferable that a wall-shaped or pole-shaped spacer is disposed at the boundary between adjacent liquid crystal lens columns or a wall-shaped or pole-shaped spacer is disposed in a central portion of each of the liquid crystal lens columns.

In this case, although depending on the orientation process performed on the liquid crystal layer and the composition of the liquid crystal material of which the liquid crystal layer is made, the wall-shaped or pole-shaped spacers can be disposed in positions where the orientation of the liquid crystal molecules in the liquid crystal layer does not change when the refracting power of each of the liquid crystal lens columns is changed. The situation in which "the orientation of the liquid crystal molecules does not change" used herein includes not only a situation in which the orientation of the liquid crystal molecules does not change at all but also a situation in which the orientation of the liquid crystal molecules substantially does not change. In the configuration described above, setting the refractive index of the material of which the spacers are made at an appropriate value prevents optical characteristics from changing due to the spacers.

When it is expected that an image viewer presses the surface of the variable lens array in use, wall-shaped spacers are preferably used to ensure what is called surface pressure resistance. Alternatively, it is preferable that the number of pole-shaped spacers is large enough to ensure sufficient surface pressure resistance. The pole-shaped spacers do not necessarily have a specific shape and may, for example, have a rectangular pole-like shape or a cylindrical pole-like shape.

In the variable lens array having the variety of preferred configurations described above according to the embodiments of the present disclosure, it is preferable that the peripheries of the first and second substrates of the variable lens array are sealed by a sealer and that a gap is present between each end of the wall-shaped or pole-shaped spacers and the sealer, from the viewpoint of ensuring fluidity of the liquid crystal material in processes of manufacturing the variable lens array.

The first and second substrates that form the variable lens array can be made of a material transparent to light. The material of which the first and second substrates are made may, for example, be an acrylic material, a polycarbonate resin (PC), an ABS resin, polymethylmethacrylate (PMMA), a polyalylate resin (PAR), a polyethylene terephthalate (PET) resin, and glass. The first and second substrates may be made of the same material or materials different from each other.

Each of the first common electrode on the first substrate and the second common electrode on the second substrate can be formed of a light-transmissive metal thin film or may be made of indium tin oxide (ITO), indium zinc oxide (IZO), or any other suitable transparent conductive material. The first and second common electrodes can be formed by using vacuum evaporation, sputtering, or other physical vapor deposition (PVD) methods, a variety of chemical vapor deposition (CVD) methods, or other suitable known methods.

The liquid crystal layer disposed between the first substrate and the second substrate can be made of a nematic liquid crystal material or any other suitable known material. The liquid crystal layer is not necessarily made of a specific material and may be made of a positive liquid crystal material or a negative liquid crystal material.

The wall-shaped or pole-shaped spacers are not necessarily formed by using a specific method. A method for forming the spacers may, for example, be screen printing or a photosensitivity-based method. Screen printing includes the steps of forming openings in the portions of a screen that correspond to portions where spacers are formed, using a squeegee to allow a spacer forming material on the screen to pass through the openings, forming a layer of the spacer forming material on a substrate, and hardening the layer as necessary. A photosensitivity-based method includes the steps of forming a layer of a photosensitive spacer forming material on a substrate and patterning the layer of the spacer forming material by exposing the layer to light and developing the layer. The spacers can be made of a transparent polymer material or any other suitable known material.

The sealer that seals the gap between the periphery of the first substrate and the periphery of the second substrate can be made of a thermosetting epoxy-based resin material or any other suitable known sealing material.

The display unit used in the display apparatus according to the embodiments of the present disclosure can be a liquid crystal display panel, an electroluminescence display panel, a plasma display panel, or any other suitable known display panel. The display unit may display information in monochrome or color.

In the embodiments described below, a transmissive monochromatic liquid crystal display panel is used as the display unit. In the description of the embodiments, the variable lens array is disposed between the display unit and the image viewer. The structure according to the embodiments of the present disclosure is not limited to that described above, but the variable lens array may alternatively be disposed between a transmissive display unit and an illuminator.

The liquid crystal display panel is formed, for example, of a front panel including a transparent common electrode, a rear panel including transparent pixel electrodes, and a liquid crystal material disposed between the front panel and the rear panel. The liquid crystal display panel does not necessarily operate in a specific mode. The liquid crystal display panel may be driven in what is called a TN mode or a VA or IPS mode.

The number of pixels M×N of the display unit is expressed by (M,N). Specific values of (M,N) can, for example, be VGA (640, 480), S-VGA (800, 600), XGA (1024, 768), APRC (1152, 900), S-XGA (1280, 1024), U-XGA (1600, 1200), HD-TV (1920, 1080), and Q-XGA (2048, 1536), and even (3840, 2160), (1920, 1035), (720, 480), (1280, 960), and several other types of resolution for displaying an image but not limited thereto.

A known illuminator can be used to illuminate the rear side of the transmissive display panel. The illuminator is not necessarily configured in a specific manner. The illuminator can be formed of a light source, a prism sheet, a diffuser sheet, a light guide, and other known members.

A drive circuit that drives the display unit and a drive circuit that drives the variable lens array can be formed of a variety of circuits. Each of the circuits can be formed, for example, of known circuit devices.

A variety of conditions shown in the present specification may be exactly or substantially satisfied. A variety of design or manufacturing nonuniformity are permitted.

First Embodiment

A first embodiment according to the present disclosure relates to a display apparatus and a variable lens array.

FIG. 1 is a diagrammatic exploded, perspective view of a display apparatus used in the first embodiment.

A display apparatus 1 includes a display unit 10 that displays two-dimensional images and a variable lens array 30 so disposed that it faces the display unit 10, as shown in FIG. 1.

It is assumed for convenience of description that a display area 11 of the display unit 10 is parallel to an X-Z plane and that a viewer on the +y side (viewing area side) views images.

The variable lens array 30 is so disposed that it faces the front side of the display unit 10 (image viewer side) and so held by a holding member (not shown) that the variable lens array 30 faces the display unit 10 with a predetermined design distance therebetween. A liquid crystal layer and other components are disposed between a first substrate 130A and a second substrate 130B of the variable lens array 30, as will be described later. Reference character 137 denotes a sealer. The variable lens array 30 will be described in detail later with reference to FIGS. 2 and 3, which will be described later.

An illuminator 20 that illuminates the display unit 10 with light is disposed on the rear side of the display unit 10. The illuminator 20 is formed, for example, of a light source, a prism sheet, a diffuser sheet, a light guide, and other members (not shown).

A first polarizer film (not shown) that polarizes light in the Z direction is bonded to the rear surface of the display unit 10, and a second polarizer film (not shown) that polarizes light in the X direction is bonded to the front surface of the display unit 10. The light traveling from the display area 11 toward the variable lens array 30 is therefore polarized in the X direction.

Pixels 12 are arranged across the display area 11 of the display unit 10, specifically, M pixels 12 are arranged in the horizontal direction (X direction in FIG. 1) and N pixels 12 are arranged in the vertical direction (Z direction in FIG. 1). The pixels 12 along an m (m=1, 2, . . . , M) column are expressed as pixels $12_m$.

In the variable lens array 30, P liquid crystal lens columns (variable lens columns) 31 extending in the vertical direction are arranged in the horizontal direction. A p-th (p=1, 2, . . . , P) liquid crystal lens column 31 is expressed as a liquid crystal lens column $31_p$. The relationship of "P" with "M", which has been described above, will be described later.

The description will be made by assuming for convenience of description that the number of viewpoints involved in viewing displayed stereoscopic images is four, viewpoints $A_1, A_2, \ldots, A_4$ present in a central viewing area $WA_C$ only by way of example. The number of viewing areas and the number of viewpoints can be set as appropriate in accordance with the design of the display apparatus 1. The stereoscopic images can be viewed even at viewpoints in an area $WA_L$ and an area $WA_R$ to the left and right of the central viewing area $WA_C$ by preferably setting the positional relationship between the display unit 10 and the liquid crystal lens columns 31.

A drive circuit (not shown) drives the display unit 10. Specifically, the orientation of the liquid crystal molecules in each of the pixels 12 is so controlled that two-dimensional images according to an external video signal are displayed. Further, another drive circuit (not shown) drives the variable lens array 30 in such a way that the refracting power of each of the liquid crystal lens columns 31 is set differently, for example, in a case where stereoscopic images are displayed and a case where regular images are displayed. The control of the liquid crystal lens columns 31 will be described later in detail with reference to FIGS. 8 to 11, which will be described later.

The configuration of the variable lens array 30 will next be described with reference to FIGS. 2 and 3.

Figure 2:
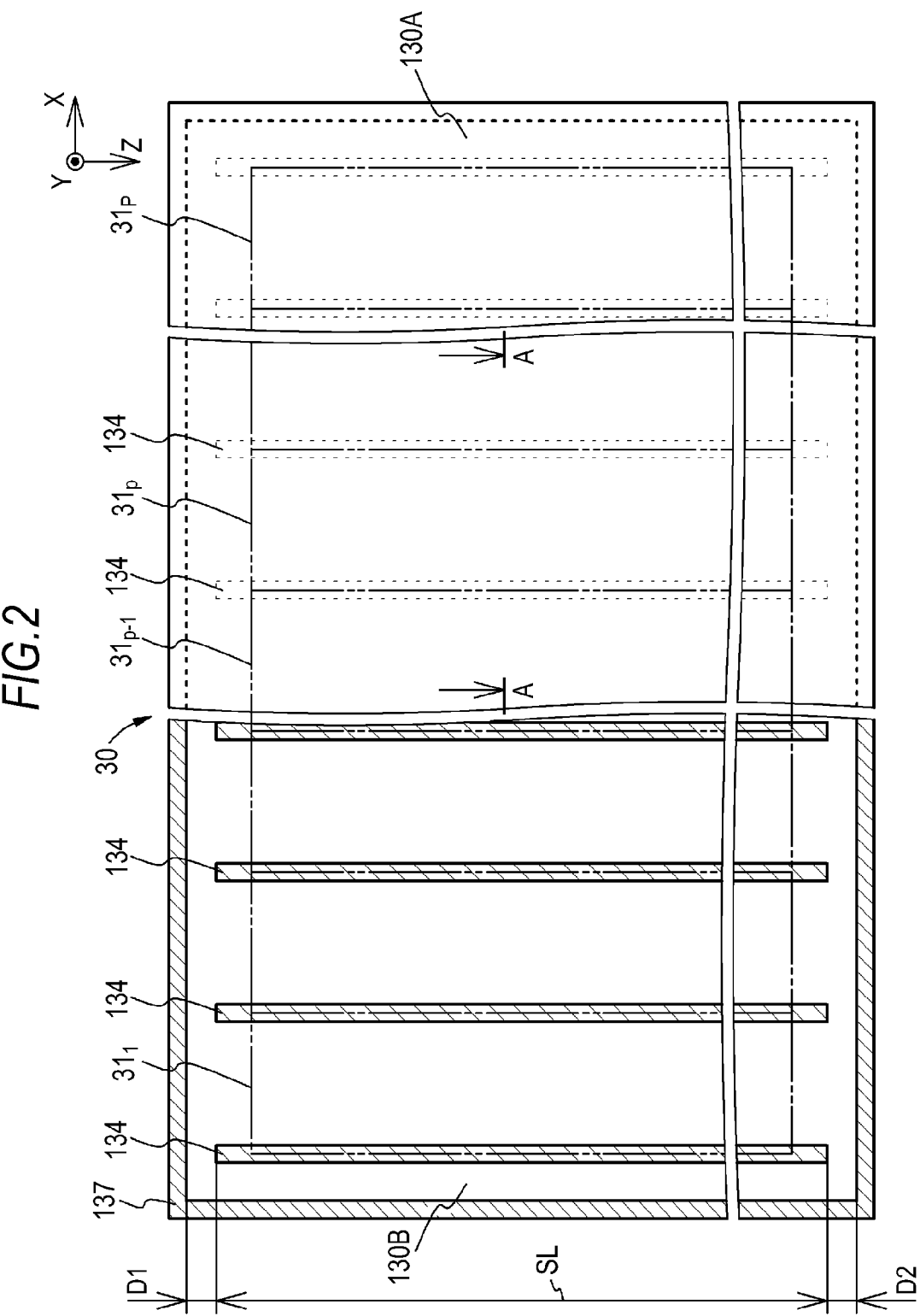
FIG. 2 is a diagrammatic plan view of the front side of a variable lens array.

FIG. 2 is a diagrammatic plan view of the front side of the variable lens array. In FIG. 2, part of the first substrate 130A is cut away to show the portion behind the first substrate 130A. Further, the liquid crystal layer and other components are omitted for convenience of illustration in the portion where part of the first substrate 130A is cut away. FIG. 3 is a cross-sectional view taken along the line A-A shown in FIG. 2. FIG. 3 also diagrammatically shows pixels corresponding to the liquid crystal lens columns 31 shown in FIG. 3.

Figure 3:
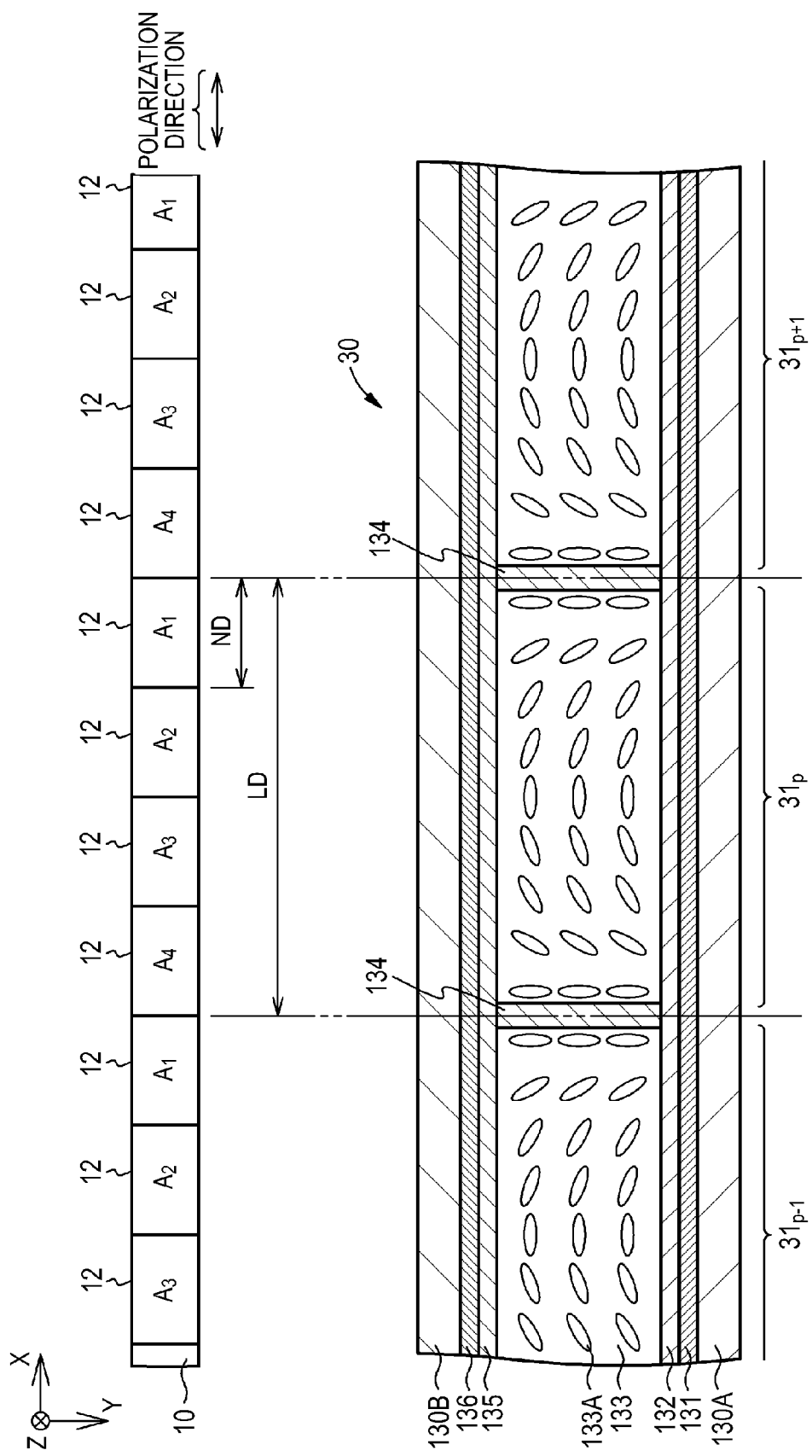
FIG. 3 is a cross-sectional view taken along the line A-A shown in FIG. 2.

The variable lens array 30 includes the first substrate 130A having a transparent first common electrode 131, the second substrate 130B having a transparent second common electrode 136, and the liquid crystal layer 133 disposed between the first substrate 130A and the second substrate 130B and forming the liquid crystal lens columns 31, as shown in FIG. 3.

The first common electrode 131 is formed on the surface (inner surface) of the first substrate 130A that faces the liquid crystal layer 133, and the second common electrode 136 is formed on the surface (inner surface) of the second substrate 130B that faces the liquid crystal layer 133. The liquid crystal layer 133 is made of a positive nematic liquid crystal material.

The first common electrode 131 and the second common electrode 136 are made of ITO or any other suitable transparent conductive material and formed by using a known film formation technique. The first common electrode 131 is formed on the entire surface of the first substrate 130A, and the second common electrode 136 is formed on the entire surface of the second substrate 130B.

A first orientation film 132 is further formed over the first substrate 130A and covers the entire surface of the first common electrode 131, and a second orientation film 135 is further formed over the second substrate 130B and covers the entire surface of the second common electrode 136, as shown in FIG. 3. The orientation films are made, for example, of a photosensitive polyimide material, and the orientation characteristics of the orientation films are controlled by light irradiation. The orientation control and other related processes will be described later in detail with reference to FIGS. 4A to 4C, 5A to 5C, 6A and 6B, and 7, which will be described later.

The first orientation film 132 and the second orientation film 135 define the directions of the molecule axes of the liquid crystal molecules 133A in a state in which no potential difference is present between the first common electrode 131 and the second common electrode 136 (state in which no electric field is applied). The orientation films thus orient the liquid crystal molecules 133A in the liquid crystal layer 133 in such a way that each of the liquid crystal lens columns 31 produces refracting power in the state in which no potential difference is present between the first common electrode 131 and the second common electrode 136. FIG. 3 shows the orientation of the liquid crystal molecules 133A in the state in which no potential difference is present between the first common electrode 131 and the second common electrode 136. The voltage applied between the first common electrode 131 and the second common electrode 136 controls the refracting power of each of the liquid crystal lens columns 31, as will be described later in detail with reference to FIGS. 8 to 11, which will be described later.

The orientation of the liquid crystal molecules 133A in the state in which no potential difference is present between the first common electrode 131 and the second common electrode 136 will now be described. For convenience of description, consider an azimuth angle with the X-Z plane being a reference plane and the X axis being a reference axis, and also consider a polar angle with the Y axis being a reference axis. The azimuth angle of the molecule axes (major axes) of the liquid crystal molecules 133A is about zero degrees. In other words, the molecule axes of the liquid crystal molecules 133A are oriented substantially in parallel to the X-Y plane.

On the other hand, the absolute values of the polar angles of the molecule axes of the liquid crystal molecules 133A are about zero degrees at both ends of each of the liquid crystal lens columns 31 (in the vicinity of spacers 134 in FIG. 3, the spacers 134 will be described later in detail), increase toward a central portion of the liquid crystal lens column 31, and become about 90 degrees in the central portion of the liquid crystal lens column 31. In other words, the liquid crystal molecules 133A in a liquid crystal lens column $31_p$, for example, are oriented in the Y direction in the vicinity of the left spacer 134 shown in FIG. 3 and inclined rightward in FIG. 3 as the liquid crystal molecules 133A approach the center of the liquid crystal lens column $31_p$. Similarly, the liquid crystal molecules 133A in the liquid crystal lens column $31_p$ are oriented in the Y direction in the vicinity of the right spacer 134 shown in FIG. 3 and inclined leftward in FIG. 3 as the liquid crystal molecules 133A approach the center of the liquid crystal lens column $31_p$. The liquid crystal molecules 133A in the liquid crystal lens column $31_p$ are oriented in the X direction at the center of the liquid crystal lens column $31_p$.

A single liquid crystal lens column 31 basically corresponds to the pixels 12 in four columns. Now, reference character LD denotes the horizontal interval between the liquid crystal lens columns 31, and reference character ND denotes the horizontal interval between the pixels 12. In this case, the following expression is satisfied: LD≈4×ND. For example, when the pixel interval ND is $1×10^2$ [μm], the interval LD between the liquid crystal lens columns 31 is about $4×10^2$ [μm]. Further, the relationship between "P" and "M" described above is P≈M/4.

The spacers 134 are provided between the first substrate 130A and the second substrate 130B, as shown in FIGS. 2 and 3. Each of the spacers 134 is disposed at the boundary between adjacent liquid crystal lens columns 31. The following description will be made by assuming that each of the spacers 134 has a wall-like shape. Each of the spacers 134 may alternatively have a pole-like shape. The spacers 134 are made of a transparent polymer material. In the first embodiment, the spacers 134 are formed on the second orientation film 135 in positions of the boundaries between the liquid crystal lens columns 31.

The thickness of each of the spacers 134 (width in X direction) is, for example, 25 [μm], and the height thereof (width in Y direction) is, for example, 50 [μm]. The aspect ratio of the spacers shown in the drawings does not reflect the values described above for convenience of illustration. The periphery of the first substrate 130A and the periphery of the second substrate 130B are sealed by the sealer 137 made, for example, of an epoxy-based resin material, and a gap is present between each end of the wall-shaped spacers 134 and the sealer 137, as shown in FIG. 2. Specifically, the length SL of the spacers 134 shown in FIG. 2 is so set that the ends of the wall-shaped spacers 134 are set apart from the sealer 137 by distances D1 and D2. The distances D1 and D2 are so set that the liquid crystal material smoothly flows into the space between the substrates when the variable lens array 30 is manufactured. This holds true for the other embodiments, which will be described later.

A method for manufacturing the variable lens array 30 will be described below with reference to FIGS. 4A to 4C, FIGS. 5A to 5C, FIGS. 6A and 6B, and FIG. 7. These figures are basically the same as the cross-sectional view taken along the line A-A in FIG. 2. In FIGS. 5A to 5C and FIG. 6A, the direction of the Y axis is reversed for convenience of illustration. It is further assumed that an orientation film having undergone an optical orientation process using non-polarized light orients liquid crystal molecules in such a way that the major axes thereof are aligned with the light irradiation direction.

Figure 4:
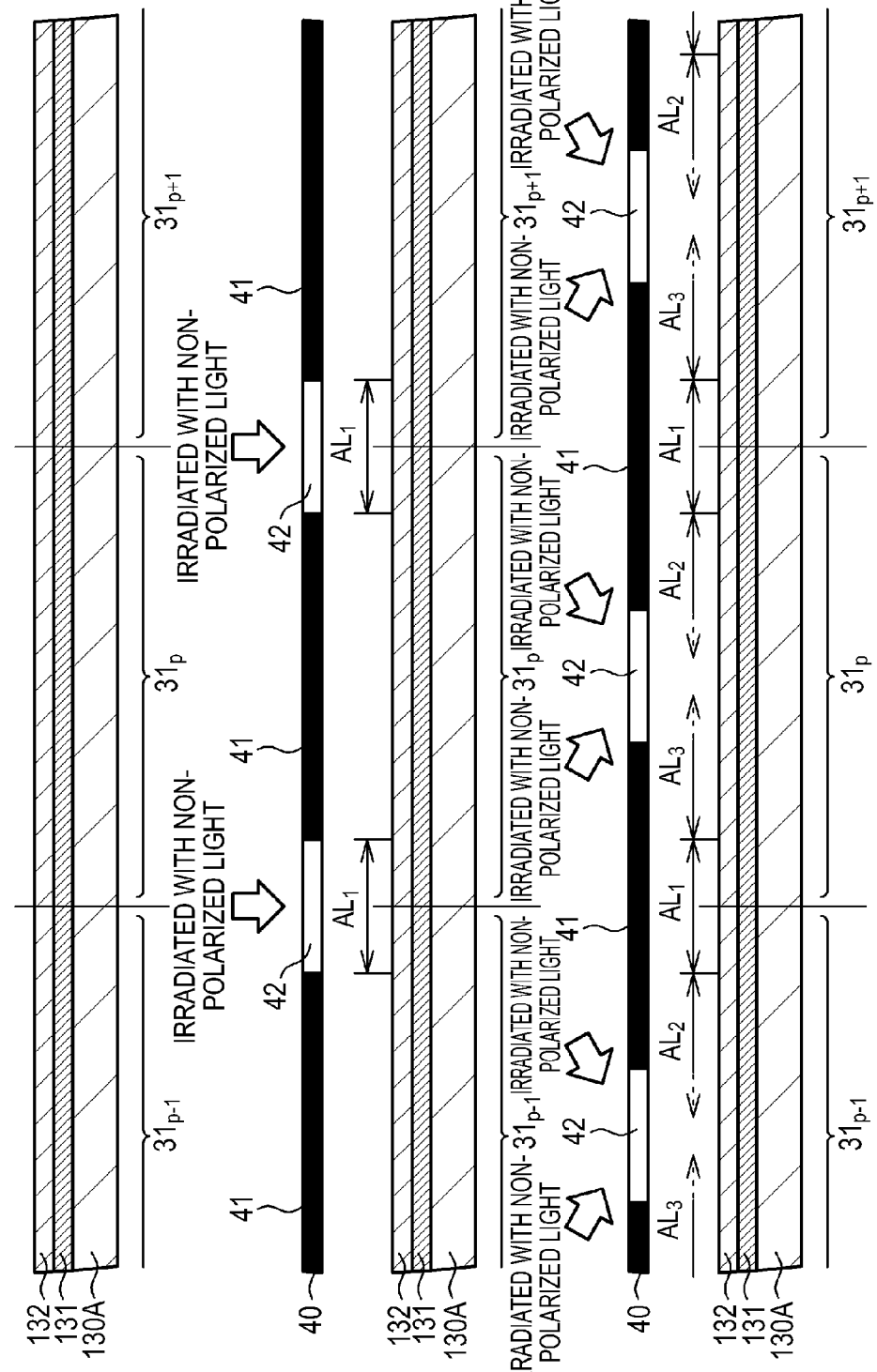
FIGS. 4A to 4C are diagrammatic partial cross-sectional views of a first substrate and other components and describe a method for manufacturing the variable lens array.

[Step 100] (see FIG. 4A)

The first common electrode 131 made, for example, of ITO is first formed on the first substrate 130A by using a known method. The first orientation film 132 made, for example, of a photosensitive polyimide material is then formed on the entire surface of the first common electrode 131 by using a known method.

[Step 110] (see FIGS. 4B and 4C)

A mask 40 having slit-shaped openings 42 is then used to perform optical orientation of the first orientation film 132.

The mask 40 has the slit-shaped openings 42 extending in the Z direction and a light blocker 41 between adjacent openings 42. The mask 40 can be made of a known material by using a known method. The interval between the openings 42 in the X direction is the same as the interval LD between the liquid crystal lens columns 31 shown in FIG. 3. The width of each of the openings 42 in the X direction may be set at a preferable value as appropriate in accordance with the specifications of the variable lens array 30.

The mask 40 is so placed that it faces the first orientation film 132 and portions corresponding to the boundaries between the liquid crystal lens columns 31 correspond to the centers of the respective openings 42. The mask 40 is then irradiated with non-polarized light emitted from a light source (not shown) and traveling in the Y direction, and the areas of the first orientation film 132 that correspond to the opening 42 (labeled with reference character $AL_1$) undergo optical orientation (see FIG. 4B).

The mask 40 is then so placed that it faces the first orientation film 132 and portions corresponding to central portions of the liquid crystal lens columns 31 correspond to the centers of the respective openings 42. The mask 40 is then irradiated with non-polarized light emitted from the light source (not shown) and traveling rightward and downward in FIG. 4C, and areas $AL_2$ of the first orientation film 132 that are positioned to the left of the areas $AL_1$ undergo optical orientation. The mask 40 is then irradiated with non-polarized light emitted from the light source (not shown) and traveling leftward and downward in FIG. 4C, and areas $AL_3$ of the first orientation film 132 that are positioned to the right of the areas $AL_1$ undergo optical orientation (see FIG. 4C).

Figure 5:
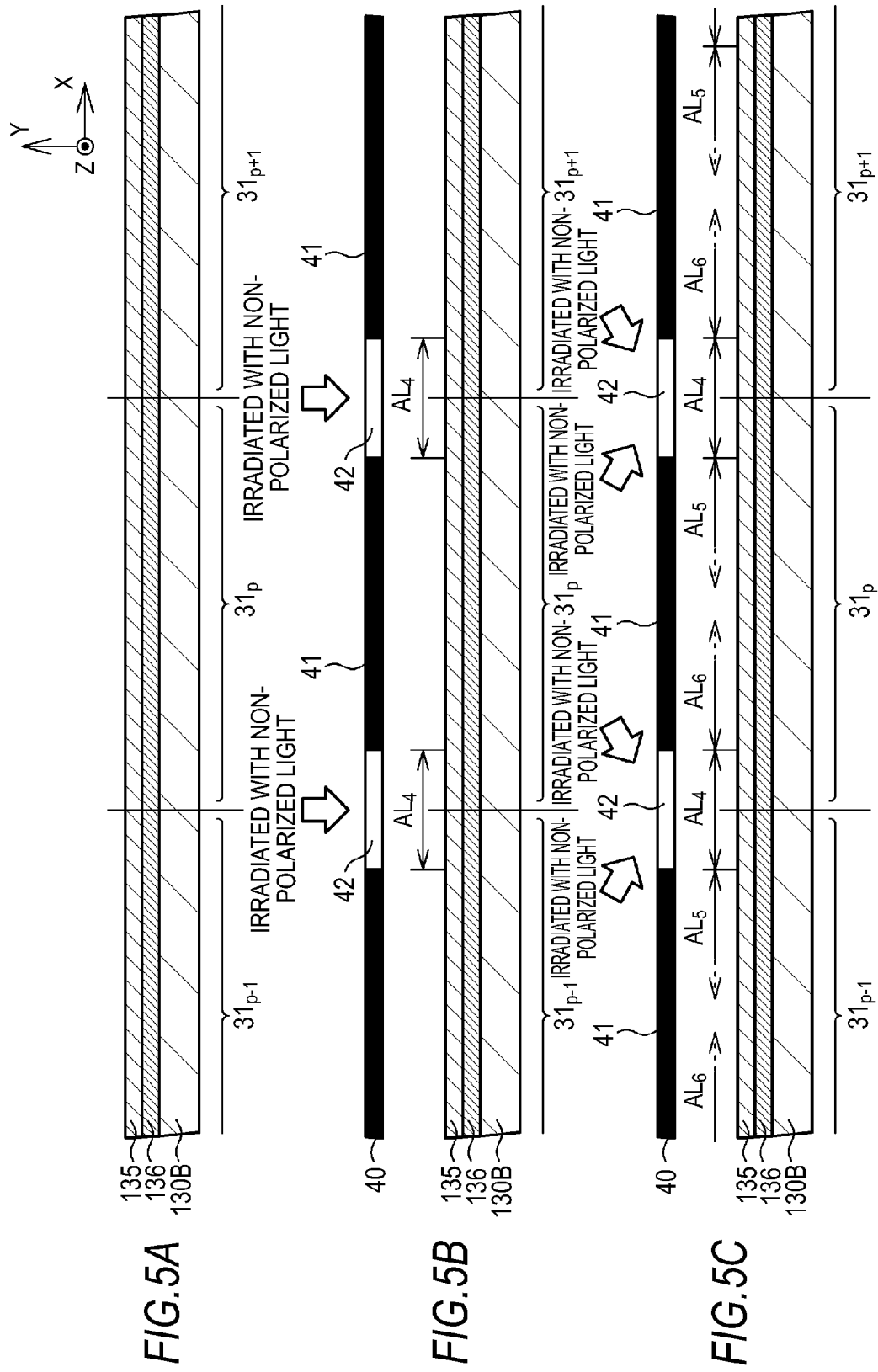
FIGS. 5A to 5C are diagrammatic partial cross-sectional views of a second substrate and other components and describe the method for manufacturing the variable lens array after the process shown in FIG. 4C.

[Step 120] (see FIG. 5A)

The second common electrode 136 made, for example of ITO is then formed on the second substrate 130B by using a known method. The second orientation film 135 made, for example, of a photosensitive polyimide material is then formed on the entire surface of the second common electrode 136 by using a known method.

[Step 130] (see FIGS. 5B and 5C)

The mask 40 described above is then used to perform optical orientation of the second orientation film 135.

The mask 40 is so placed that it faces the second orientation film 135 and portions corresponding to the boundaries between the liquid crystal lens columns 31 correspond to the centers of the respective openings 42. The mask 40 is then irradiated with non-polarized light emitted from the light source (not shown) and traveling in the Y direction, and the areas of the second orientation film 135 that correspond to the openings 42 (labeled with reference character $AL_4$) undergo optical orientation (see FIG. 5B).

The mask 40 is then irradiated with non-polarized light emitted from the light source (not shown) and traveling rightward and downward in FIG. 5C, and areas $AL_6$ of the second orientation film 135 that are positioned to the right of the areas AL₄ undergo optical orientation. The mask 40 is then irradiated with non-polarized light emitted from the light source (not shown) and traveling leftward and downward in FIG. 5C, and areas AL₅ of the second orientation film 135 that are positioned to the left of the areas AL₄ undergo optical orientation (see FIG. 5C).

Figure 6:
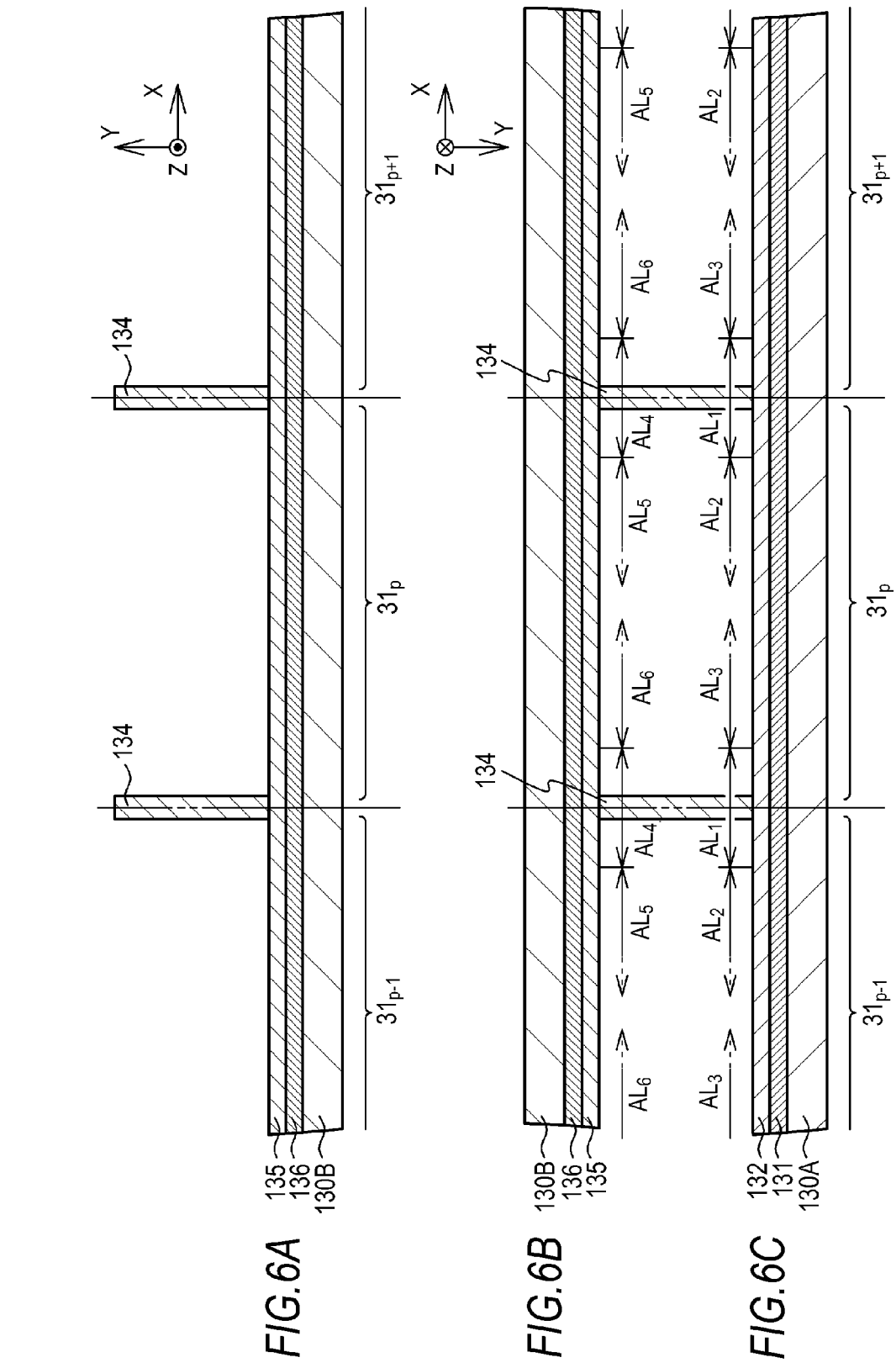
FIG. 6A is a diagrammatic partial cross-sectional view of the second substrate and other components and describes the method for manufacturing the variable lens array after the process shown in FIG. 5C.
FIG. 6B is a diagrammatic partial cross-sectional view of the first and second substrates and other components and describes the method for manufacturing the variable lens array after the process shown in FIG. 6A.

[Step 140] (see FIG. 6A)

Thereafter, a known transparent material is used to form the spacers 134 as appropriate on the second orientation film 135 in the portions corresponding to the boundaries between the liquid crystal lens columns 31 by using a known method.

Figure 7:
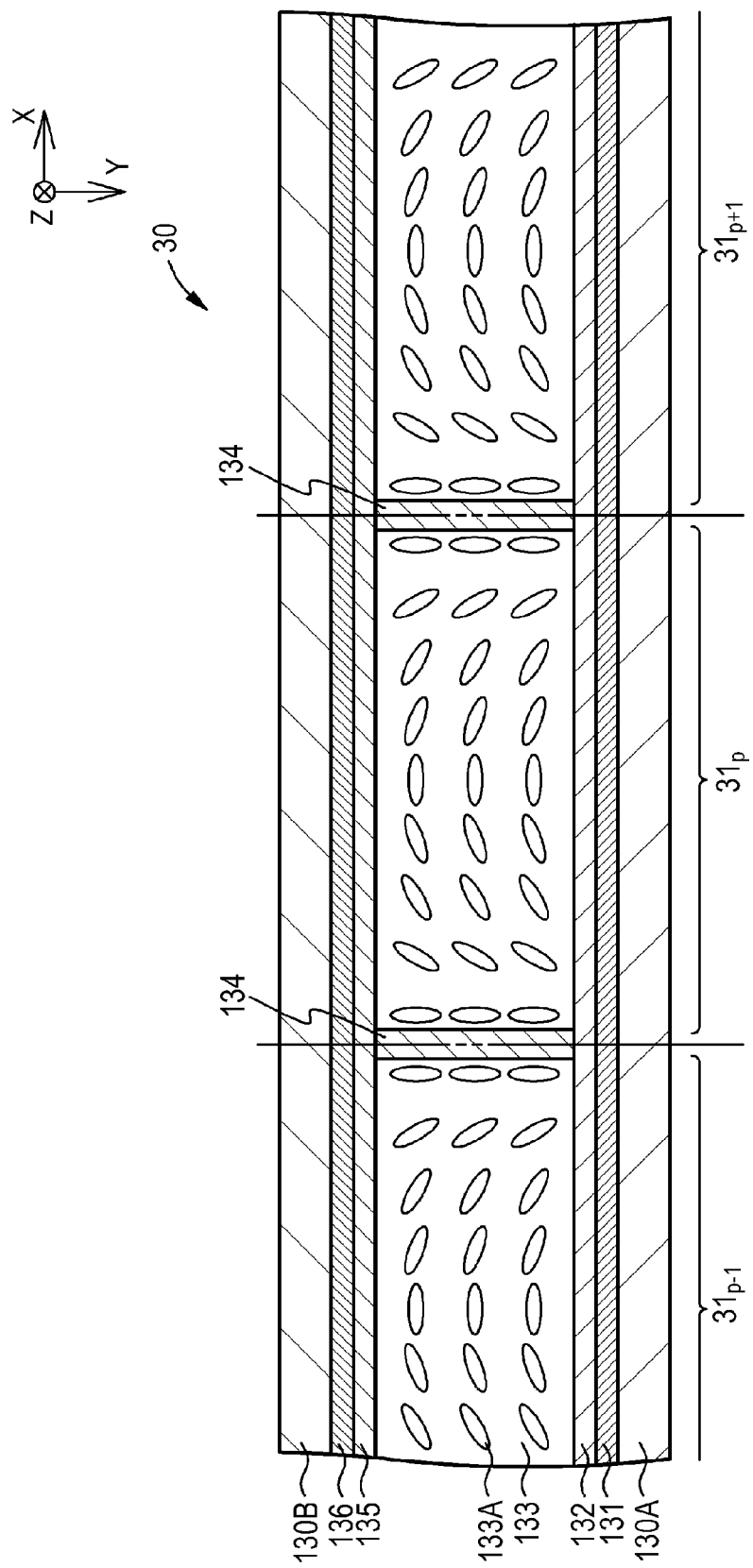
FIG. 7 is a diagrammatic partial cross-sectional view of the first and second substrates and other components and describes the method for manufacturing the variable lens array after the process shown in FIG. 6C.

[Step 150] (see FIGS. 6B and 7)

The first substrate 130A and the second substrate 130B having undergone the steps described above are then so placed that they face each other with a liquid crystal material interposed therebetween, and the peripheries of the substrates are sealed. The variable lens array 30 is thus provided. FIG. 6B shows the positional relationship among the areas having undergone the optical orientation. FIG. 7 shows the orientation of the liquid crystal molecules 133A.

The operation of the variable lens array 30 will next be described with reference to FIGS. 8 to 11. The operation of the variable lens array 30 that displays stereoscopic images will first be described, and the operation of the variable lens array 30 that displays regular images will be then described.

Figure 8:
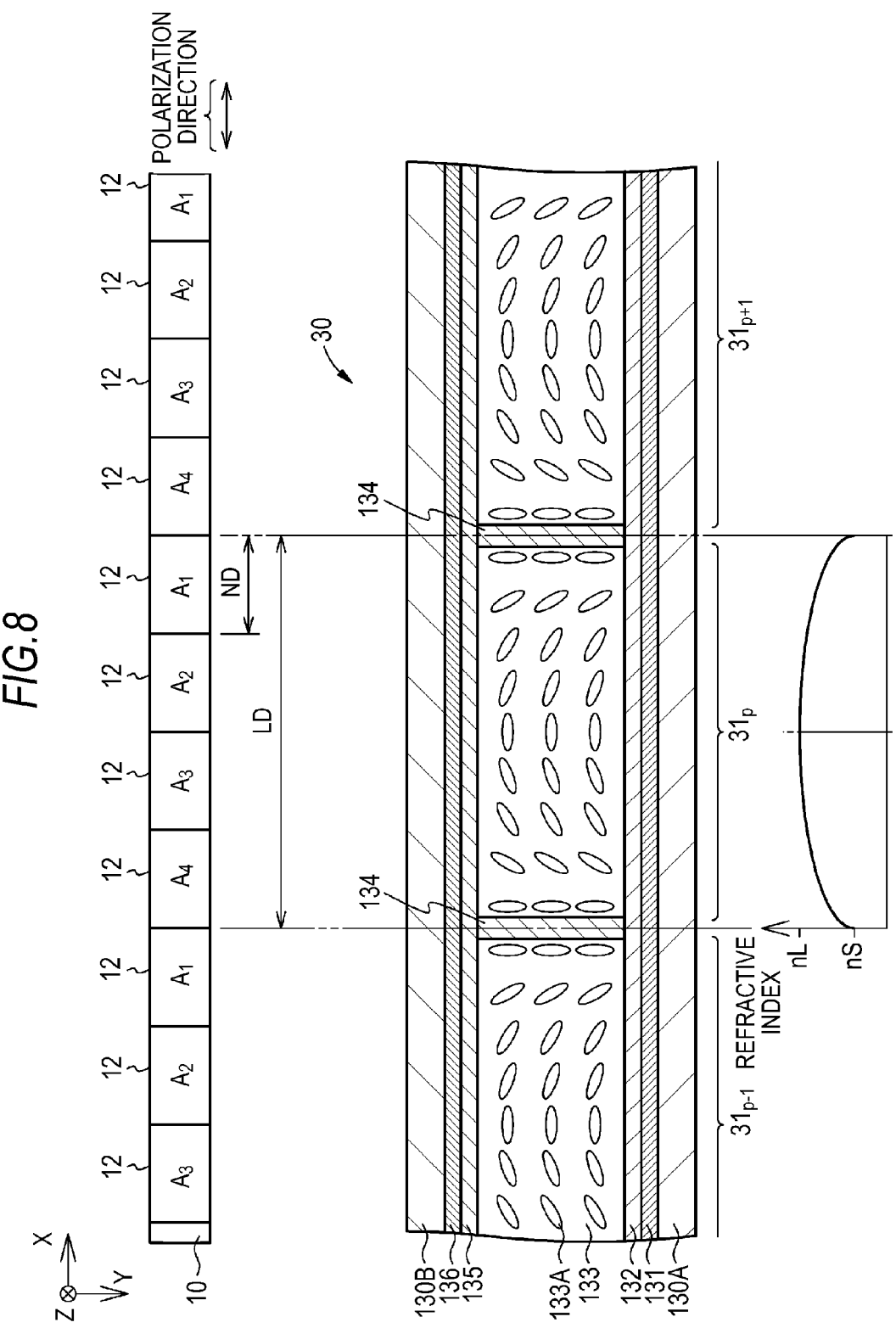
FIG. 8 is a diagrammatic cross-sectional view of part of the variable lens array and part of a display unit that display stereoscopic images.
Figure 9:
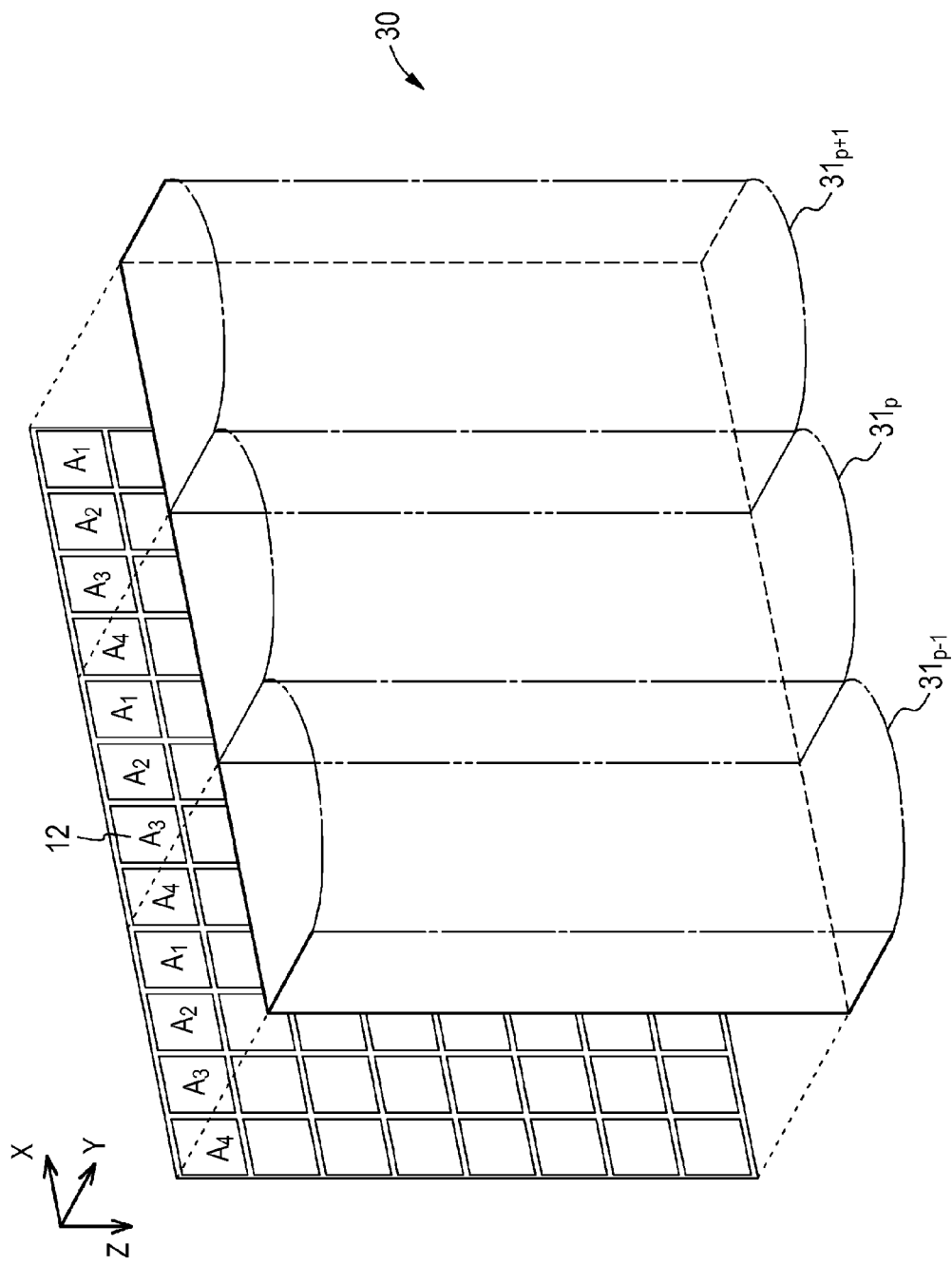
FIG. 9 is a diagrammatic perspective view of part of the display unit and part of the variable lens array.

FIG. 8 is a diagrammatic cross-sectional view of part of the variable lens array and part of the display unit that display stereoscopic images. FIG. 9 is a diagrammatic perspective view of part of the display unit and part of the variable lens array.

When the display apparatus 1 is in operation, the same voltage (zero [volt], for example) is applied to the first common electrode 131 and the second common electrode 136. Since no potential difference is present between the first common electrode 131 and the second common electrode 136, the first orientation film 132 and the second orientation film 135 orient the liquid crystal molecules 133A in the liquid crystal layer 133 as shown in FIG. 8.

The liquid crystal layer 133 is made of a positive nematic liquid crystal material. The refractive index of the liquid crystal material along the major axes of the liquid crystal molecules 133A is greater than the refractive index along the minor axes thereof. Further, the molecule axes of the liquid crystal molecules 133A are so oriented that they are substantially parallel to the X-Y plane. As a result, when the light incident from the display unit 10 is polarized in the X direction, the refractive index in the liquid crystal layer 133 is small at the periphery of each of the liquid crystal lens columns 31 and increases toward a central portion thereof, as indicated by the graph shown in FIG. 8. The reference characters "nS" and "nL" shown in FIG. 8 represent the refractive indices along the minor and major axes of the liquid crystal molecules 133A, respectively. It is noted that the graph shown in FIG. 8 is diagrammatically drawn and does not mean that the maximum and minimum of the refractive index are typically "nL" and "nS". This holds true for the graphs in the other drawings described later.

In this state, the wavefront of the light passing through each of the liquid crystal lens columns 31 travels faster in the periphery of the liquid crystal lens column 31 than portions closer to a central portion thereof. In other words, since the light travels in such a way that the wavefront thereof converges at a point, each of the liquid crystal lens columns 31 forms a liquid crystal GRIN lens that functions as a convex lens. Each of the stripe-shaped liquid crystal lens columns 31 shown in FIG. 8 is optically equivalent to a cylindrical convex lens and hence functions as a lenticular lens (see FIG. 9). The graph of the refractive index shown in FIG. 8 and the graph of the refractive index FIG. 10, which will be described later, are obtained when the polymer material of which the spacers 134 are made is a material having substantially the same refractive index as the refractive index along the minor axes of the liquid crystal molecules 133A.

Light fluxes that exit from the pixels 12 and form an image for the viewpoints $A_1, A_2, \ldots, A_4$ are redirected when they pass through the liquid crystal lens columns 31 and oriented in a predetermined direction. As a result, an image for predetermined viewpoints can be viewed in the viewing areas WA shown in FIG. 1.

Figure 10:
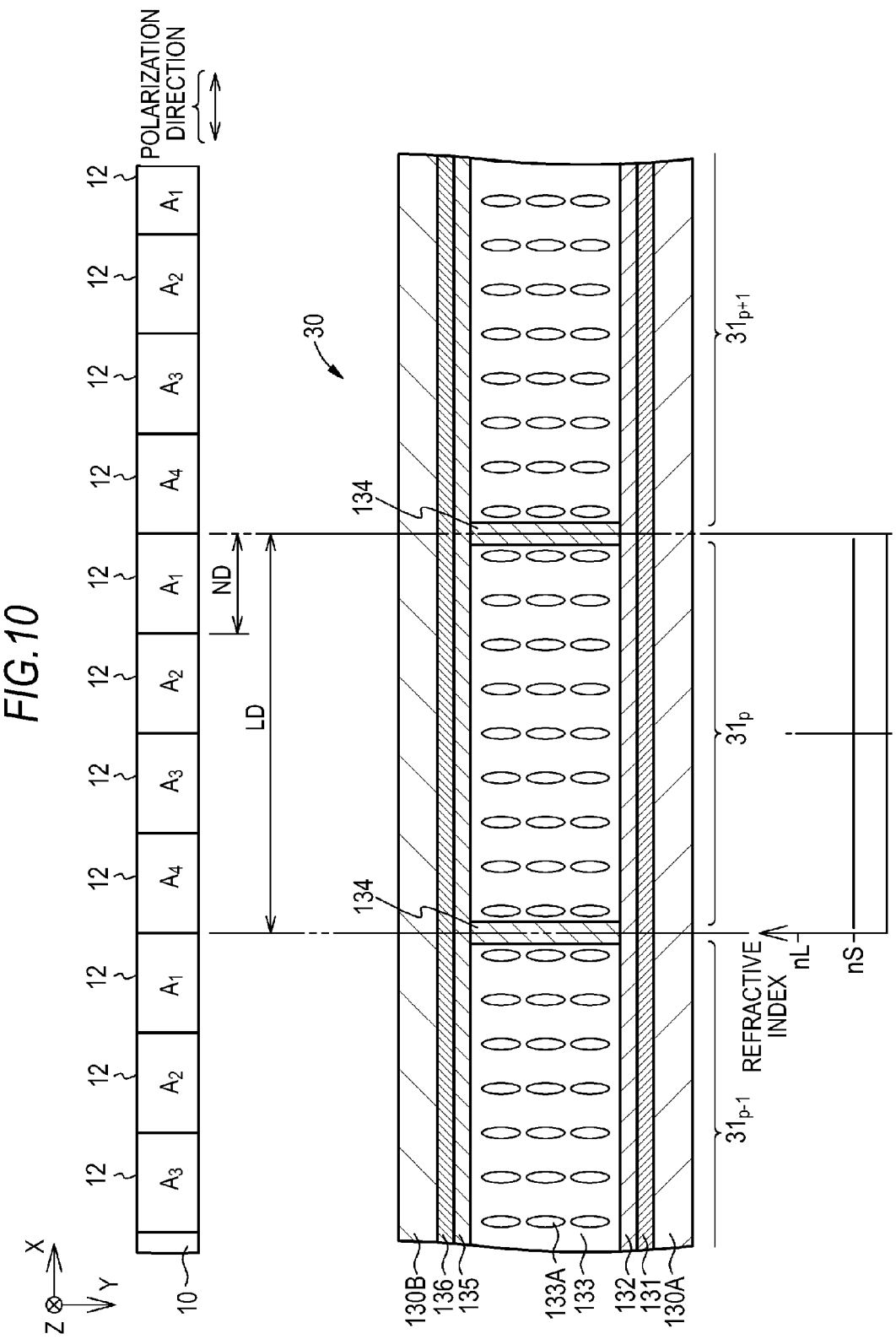
FIG. 10 is a diagrammatic cross-sectional view of part of the variable lens array and part of the display unit that display regular images.
Figure 11:
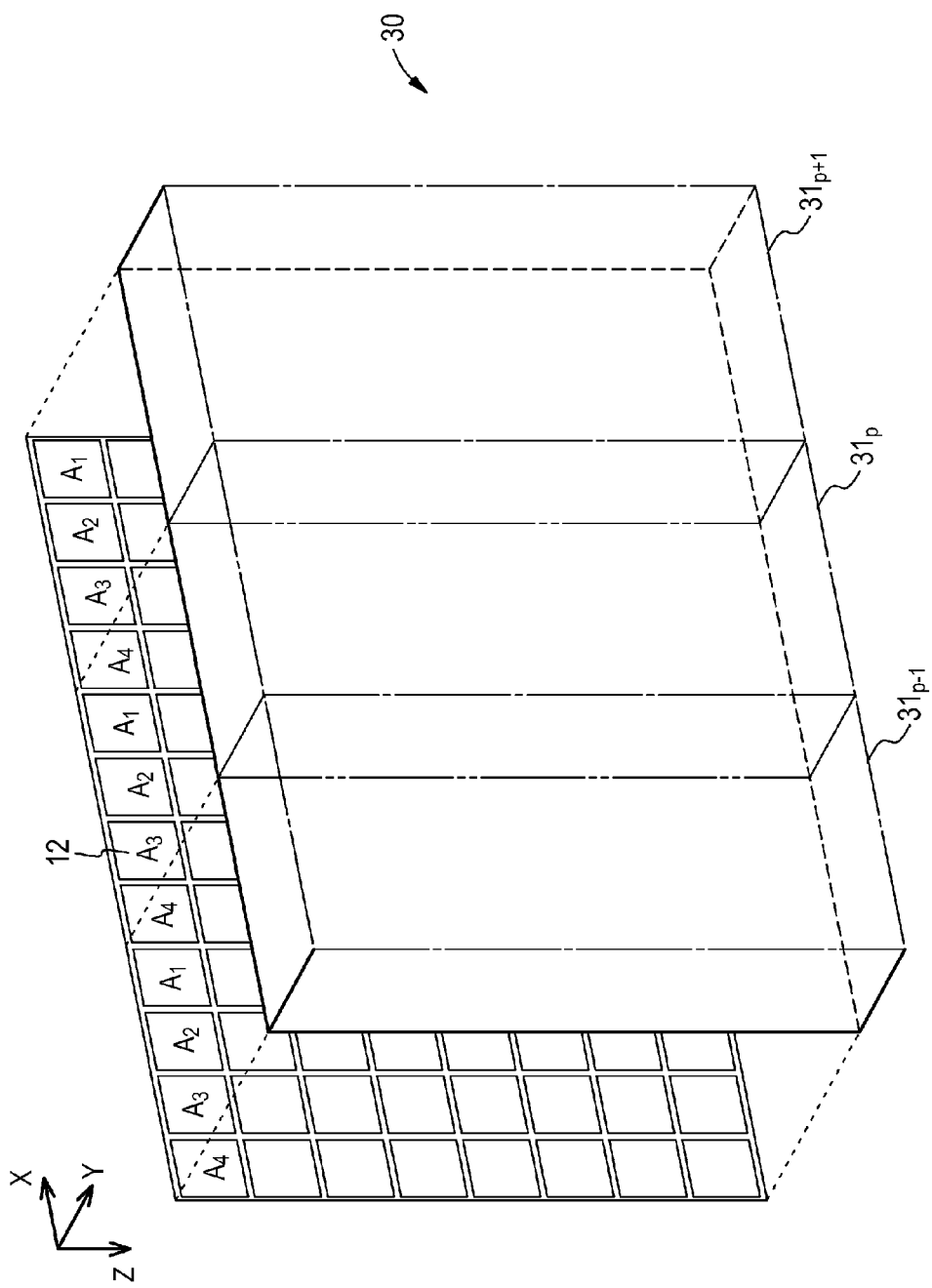
FIG. 11 is a diagrammatic perspective view of part of the display unit and part of the variable lens array.

FIG. 10 is a diagrammatic cross-sectional view of part of the variable lens array and part of the display unit that display regular images. FIG. 11 is a diagrammatic perspective view of part of the display unit and part of the variable lens array.

To display regular images, different voltages (0 [volt] and 15 [volt], for example) are applied to the first common electrode 131 and the second common electrode 136. In practice, to drive the liquid crystal layer 133 with an AC voltage, the polarity of the voltage is switched, for example, for each displayed frame. The following description will be made without consideration of the reversal of the polarity of the voltage for convenience of description.

In this state, the voltage between the first common electrode 131 and the second common electrode 136 is 15 [volt]. An electric field is therefore formed between the second common electrode 136 and the entire first common electrode 131, and the liquid crystal molecules 133A are so oriented that the major axes thereof extend in the Y direction.

In this state, the liquid crystal layer 133 simply functions as a transparent substrate made of a material having the refractive index "nS" (see FIG. 11). The display apparatus 1 operates as if it were provided with no lens array and allows the viewer to view regular images.

The first embodiment has been described above. In the variable lens array 30, the first common electrode 131 is formed on the entire surface of the first substrate 130A, and the second common electrode 136 is formed on the entire surface of the second substrate 130B. It is therefore not necessary to divide any of the electrodes in order to control the refractive index gradient in the liquid crystal layer 133 or control the applied voltage on an electrode group basis.

Further, since the spacers 134 are disposed in positions where the orientation of the liquid crystal molecules 133A does not change when the refracting power of each of the liquid crystal lens columns 31 is changed, optical characteristics will not be affected by the difference in refractive index between the spacers and the liquid crystal layer.

In the above description, the spacers 134 are disposed at the boundaries between the liquid crystal lens columns 31, but the spacers 134 are not necessarily so disposed. For example, a boundary where a spacer 134 is provided and a boundary where no spacer 134 is provided may be alternately arranged. This holds true for the other embodiments, which will be described later.

Each of the spacers 134 has a wall-like shape in the above description. Each of the spacers 134 may alternatively have a pole-like shape. This holds true for the other embodiments, which will be described later.

Figure 12:
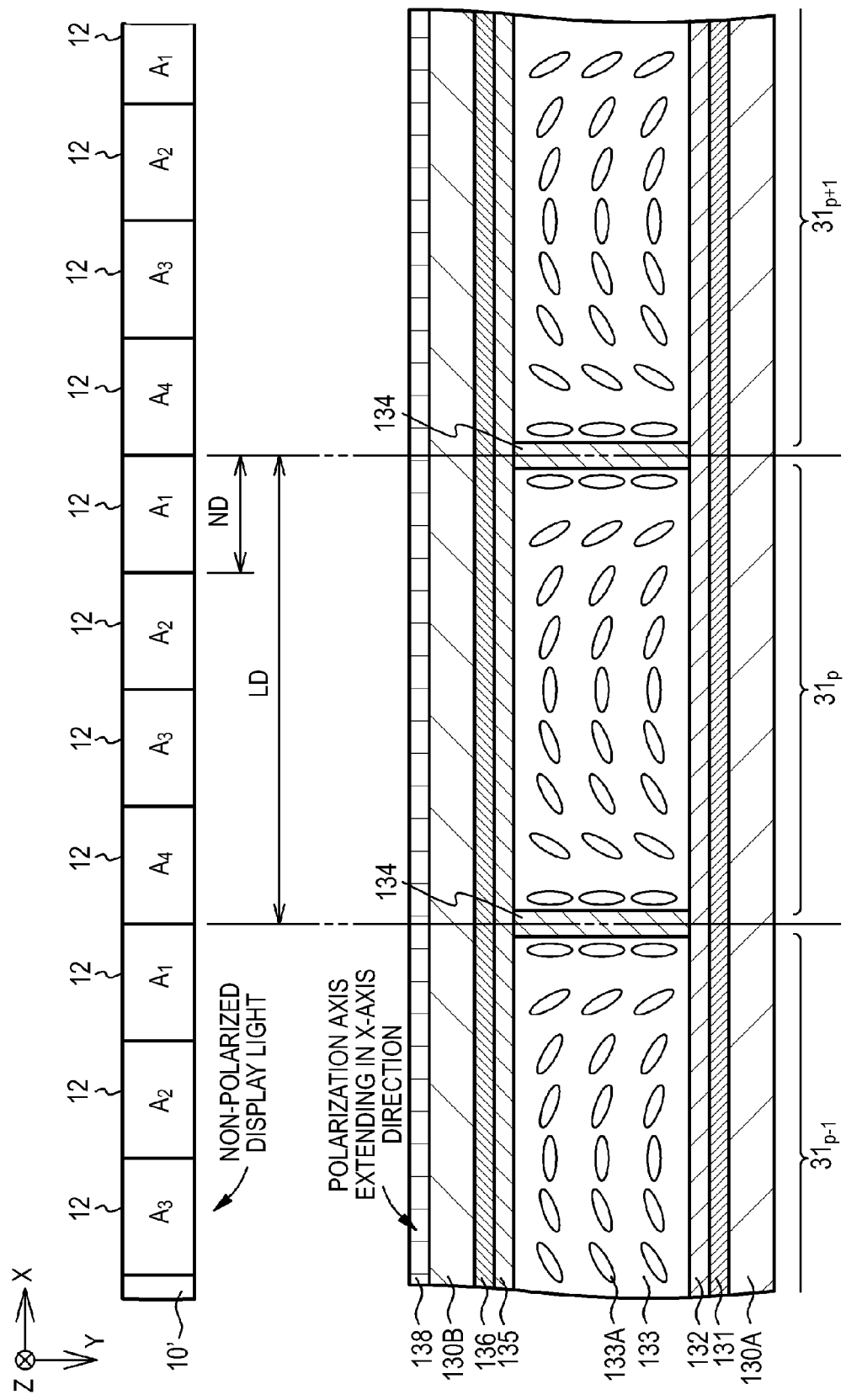
FIG. 12 is a diagrammatic cross-sectional view of a variable lens array according to a variation.

In the first embodiment, the description has been made of the case where the light from the display unit 10 is polarized in the X direction. The display unit may alternatively be a self-luminous display unit, which, however, typically emits non-polarized light. In this case, for example, an optical member 138, such as a polarizer film that polarizes light in the X direction, may be disposed on the rear surface (the side where a self-luminous display unit 10' is present) of the second substrate 130B, which forms the variable lens array 30, as shown in FIG. 12. This holds true for the other embodiments, which will be described later.

Second Embodiment

A second embodiment according to the present disclosure also relates to a display apparatus and a variable lens array.

The second embodiment differs from the first embodiment in terms of the type of the liquid crystal material of which the variable lens array is made and the specifications of the spacers that form the variable lens array. The liquid crystal layer is made of a negative nematic liquid crystal material, and each of the spacers is disposed in a central portion of the corresponding liquid crystal lens column. Except the differences described above, the second embodiment has the same configuration as that of the first embodiment.

In a diagrammatic exploded, perspective view of a display apparatus 2 used in the second embodiment, the term "display apparatus 1" shown in FIG. 1 is replaced with the term "display apparatus 2" and the term "variable lens array 30" is replaced with the term "variable lens array 230."

The configuration of the variable lens array 230 will be described with reference to FIGS. 13 and 14.

Figure 13:
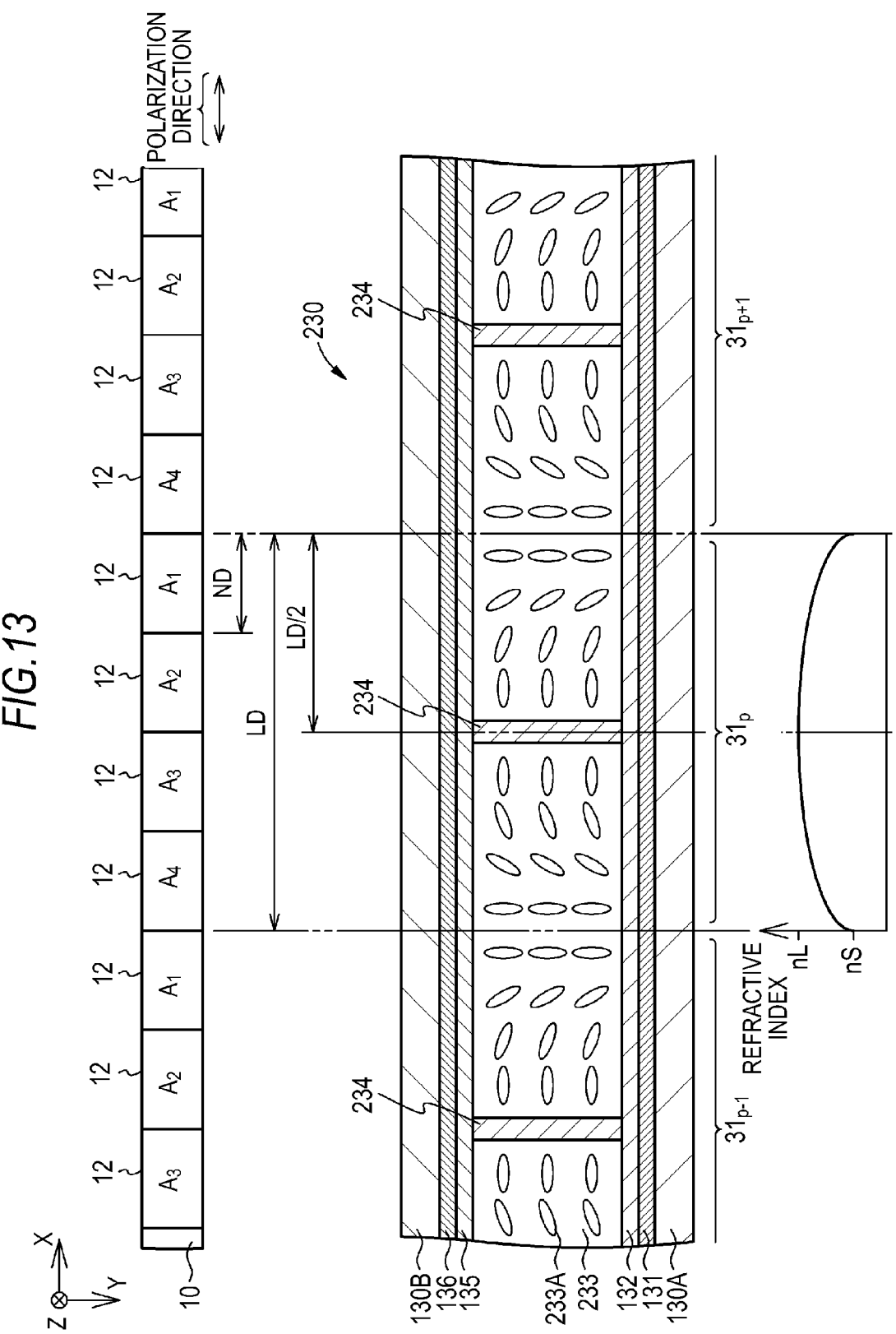
FIG. 13 is a diagrammatic cross-sectional view of part of a variable lens array and part of a display unit in a second embodiment.

FIG. 13 is a cross-sectional view of part of the variable lens array used in the second embodiment. Specifically, FIG. 13 is a cross-sectional view taken along the line A-A in FIG. 2, which is referred to in the first embodiment, but the term "variable lens array 30" is replaced with the term "variable lens array 230." Reference character 233 denotes a liquid crystal layer, and reference character 233A denotes liquid crystal molecules. FIG. 13 shows the orientation of the liquid crystal molecules 233A in a state in which no potential difference is present between the first common electrode 131 and the second common electrode 136 (in other words, in a state in which stereoscopic images are displayed). FIG. 14 is a diagrammatic cross-sectional view of part of the variable lens array and part of the display unit that display regular images.

In the variable lens array 230, the liquid crystal layer 233 is made of a negative nematic liquid crystal material, and each spacer 234 is formed in a central portion of the corresponding liquid crystal lens column 31. A method for manufacturing the variable lens array 230, which is the same as the manufacturing method described in the first embodiment except the differences described above, will be omitted.

The operation of the variable lens array 230 that displays stereoscopic images is the same as the operation described in the first embodiment with reference to FIGS. 8 and 9. That is, when the light incident from the display unit 10 is polarized in the X direction, the refractive index in the liquid crystal layer 233 is small at the periphery of each of the liquid crystal lens columns 31 and increases toward a central portion thereof, as indicated by the graph shown in FIG. 13. The graphs of the refractive index shown in FIGS. 13 and 14 are obtained when the polymer material of which the spacers 234 are made is a material having substantially the same refractive index as the refractive index along the major axes of the liquid crystal molecules 233A.

Figure 14:
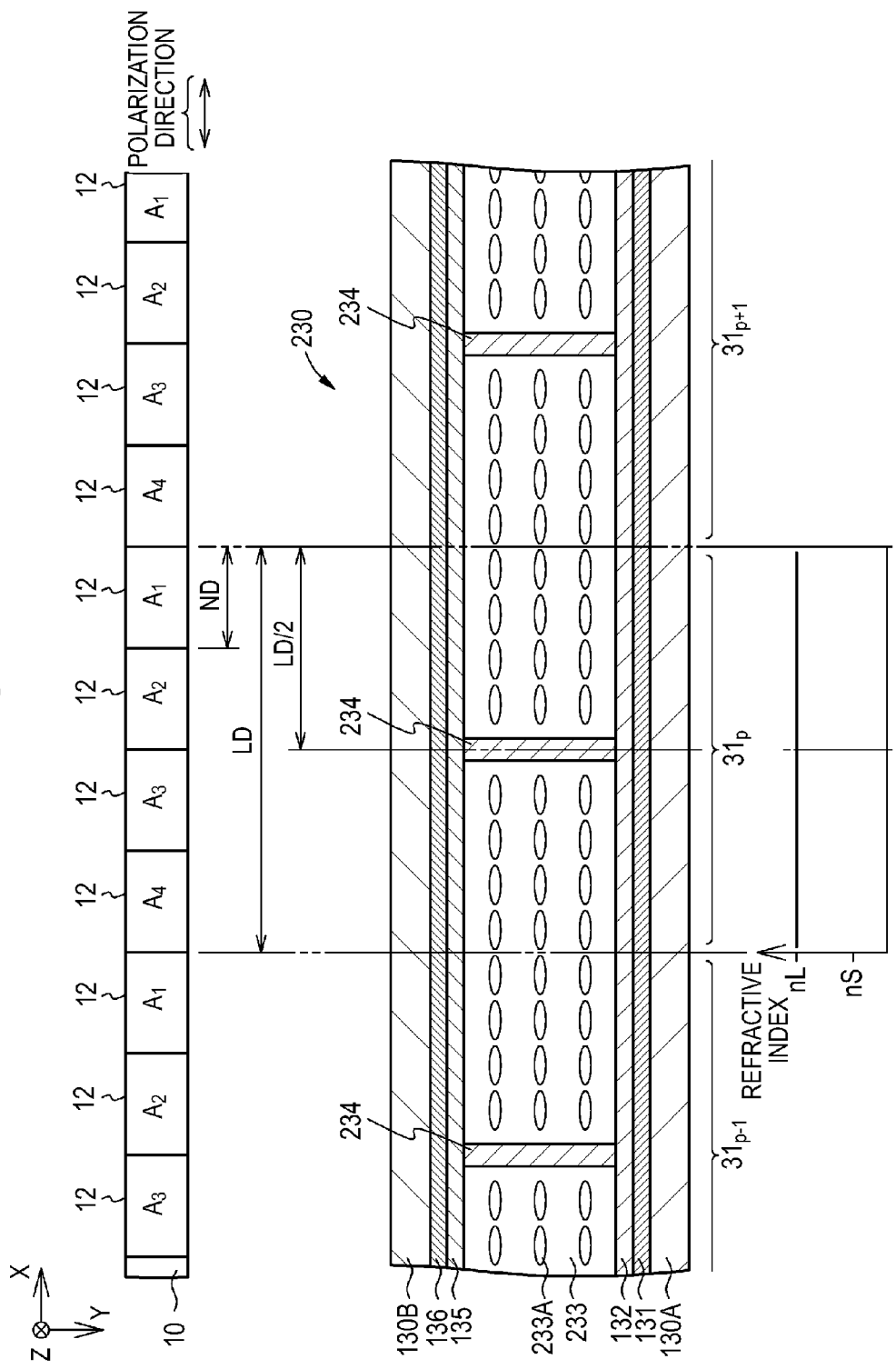
FIG. 14 is a diagrammatic cross-sectional view of part of the variable lens array and part of the display unit that display regular images.
Figure 17A:
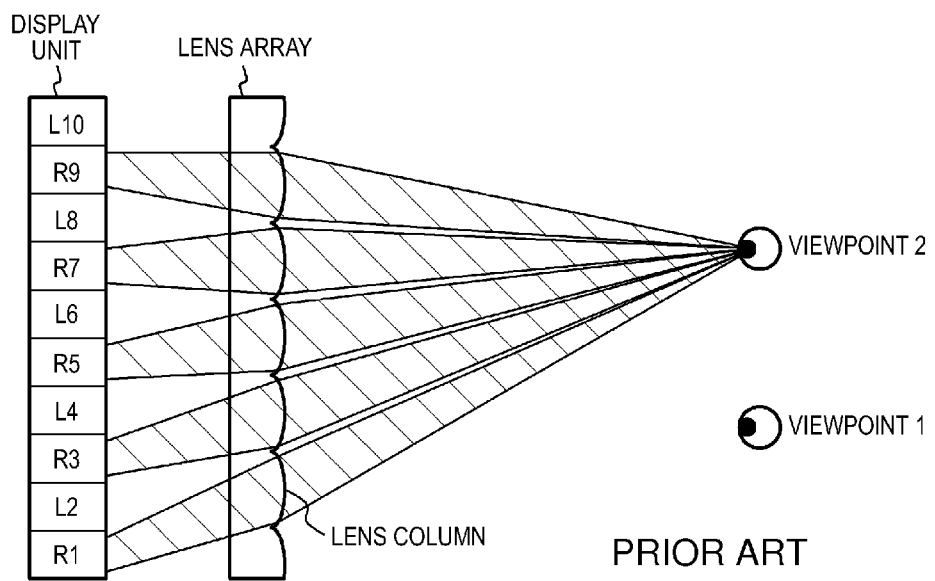
FIGS. 17A and 17B are conceptual diagrams showing the operation of a display apparatus having a lens array disposed between a display unit and an image viewer.
Figure 17B:
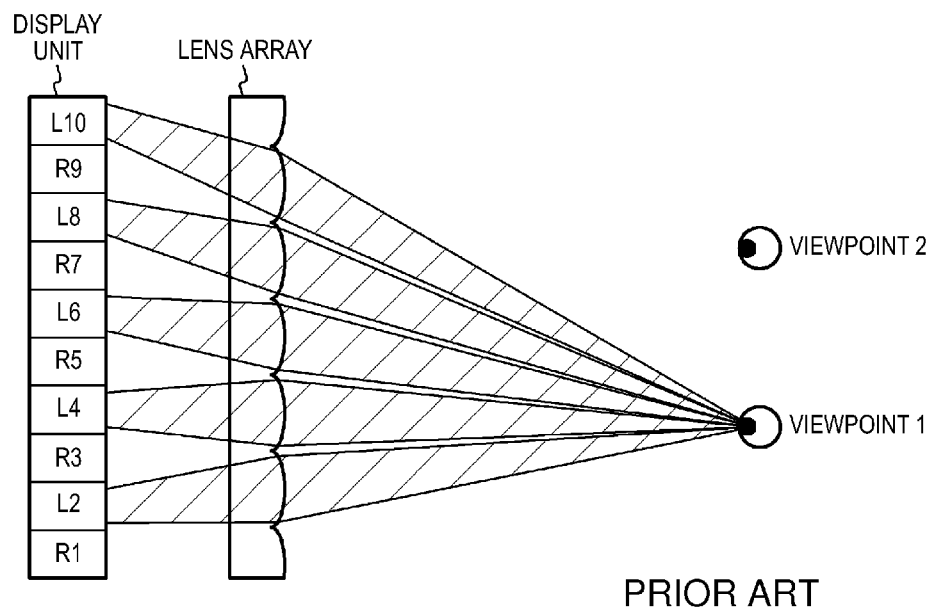

When regular images are displayed, the liquid crystal molecules 233A are oriented in the X direction, as shown in FIG. 14. Except the difference described above, the operation of the variable lens array 230 that displays regular images is basically the same as the operation described in the first embodiment with reference to FIGS. 10 and 11. In the second embodiment, the liquid crystal layer 233 simply functions as a transparent substrate made of a material having the refractive index "nL". The display apparatus 2 operates as if it were provided with no lens array and allows the viewer to view regular images.

The second embodiment has been described above. It is also not necessary in the second embodiment to divide any of the electrodes in order to control the refractive index gradient in the liquid crystal layer 233 or control the applied voltage on an electrode group basis.

Further, since the spacers 234 are disposed in positions where the orientation of the liquid crystal molecules 233A does not change when the refracting power of each of the liquid crystal lens columns 31 is changed, optical characteristics will not be affected by the difference in refractive index between the spacers and the liquid crystal layer.

Third Embodiment

A third embodiment according to the present disclosure also relates to a display apparatus and a variable lens array.

The third embodiment differs from the first embodiment in terms of the optical orientation performed on the first orientation film and the second orientation film. Except the difference described above, the third embodiment has the same configuration as that of the first embodiment.

In a diagrammatic exploded, perspective view of a display apparatus 3 used in the third embodiment, the term "display apparatus 1" shown in FIG. 1 is replaced with the term "display apparatus 3" and the term "variable lens array 30" is replaced with the term "variable lens array 330."

The configuration of the variable lens array 330 will be described with reference to FIGS. 15 and 16.

FIG. 15 is a cross-sectional view of part of the variable lens array used in the third embodiment. FIG. 16 describes the orientation of the liquid crystal molecules and is a diagrammatic plan view of the variable lens array viewed in the direction B-B shown in FIG. 15.

More specifically, FIG. 15 is a cross-sectional view taken along the line A-A in FIG. 2, which is referred to in the first embodiment, but the term "variable lens array 30" is replaced with the term "variable lens array 330." Reference character 332 denotes a first orientation film, and reference character 335 denotes a second orientation film. FIG. 15 shows the orientation of the liquid crystal molecules 133A in a state in which no potential difference is present between the first common electrode 131 and the second common electrode 136 (in other words, in a state in which stereoscopic images are displayed). In FIG. 16, components other than the liquid crystal molecules 133A and the spacers 134 are omitted for convenience of illustration.

The orientation of the liquid crystal molecules 133A in a state in which no potential difference is present between the first common electrode 131 and the second common electrode 136 will be described. Consider an azimuth angle with the X-Z plane being a reference plane and the X axis being a reference axis, and also consider a polar angle with the Y axis being a reference axis, as in the first embodiment. The polar angle of the molecule axes (major axes) of the liquid crystal molecules 133A is about 90 degrees. In other words, the major axes of the liquid crystal molecules 133A are oriented in parallel to the X-Z plane, as shown in FIGS. 15 and 16.

On the other hand, the absolute values of the azimuth angles of the molecule axes of the liquid crystal molecules 133A are about 90 degrees at both ends of each of the liquid crystal lens columns 31 (in the vicinity of the spacer 134 in FIG. 16), decrease toward a central portion of the liquid crystal lens column 31, and become about 0 degrees in the central portion of the liquid crystal lens column 31. In other words, the liquid crystal molecules 133A in a liquid crystal lens column $31_p$, for example, are oriented in the Z direction in the vicinity of the left spacer 134 shown in FIG. 16 and inclined rightward in FIG. 16 as the liquid crystal molecules 133A approach the center of the liquid crystal lens column $31_p$. Similarly, the liquid crystal molecules 133A in the liquid crystal lens column $31_p$ are oriented in the Z direction in the vicinity of the right spacer 134 shown in FIG. 16 and inclined leftward in FIG. 16 as the liquid crystal molecules 133A approach the center of the liquid crystal lens column $31_p$. The liquid crystal molecules 133A in the liquid crystal lens column $31_p$ are oriented in the X direction at the center of the liquid crystal lens column $31_p$.

The first orientation film 332 and the second orientation film 335 have undergone an optical orientation process of orienting the liquid crystal molecules 133A, as described above. Specifically, in the optical orientation process, the first orientation film 332 and the second orientation film 335 are irradiated with light through a mask that transmits light polarized in the axial directions of the liquid crystal molecules 133A shown in FIG. 16.

The operation of the variable lens array 330 that displays stereoscopic images is substantially the same as the operation described in the first embodiment with reference to FIGS. 8 and 9. That is, when the light incident from the display unit 10 is polarized in the X direction, the refractive index in the liquid crystal layer 133 is small at the periphery of each of the liquid crystal lens columns 31 and increases toward a central portion thereof, as indicated by the graph shown in FIG. 15. The graph of the refractive index shown in FIG. 15 is obtained when the polymer material of which the spacers 134 are made is a material having substantially the same refractive index as the refractive index along the minor axes of the liquid crystal molecules 133A.

The operation of the variable lens array 330 that displays regular images is the same as the operation described in the first embodiment with reference to FIGS. 10 and 11. The liquid crystal layer 133 simply functions as a transparent substrate made of a material having the refractive index "nS". The display apparatus 3 operates as if it were provided with no lens array and allows the viewer to view regular images.

The embodiments of the present disclosure have been specifically described above. The present disclosure is not limited to the embodiments described above, but a variety of variations based on the technical principles of the present disclosure can be implemented.

For example, the spacers are formed on the second substrate 130B in the embodiments described above but may alternatively be formed on the first substrate 130A. Further, an orientation film is provided on the surface of each of the first substrate 130A and the second substrate 130B that faces the liquid crystal layer in the embodiments described above, but the orientation film may alternatively be provided on the surface of only one of the substrates or the orientation characteristics of the common electrodes may be controlled in some cases. Moreover, although depending on the design of the variable lens array, bead-shaped spacers may be distributed in the liquid crystal layer in some cases.

The present disclosure can also be implemented as the following configurations.

(1) A display apparatus including
a display unit that displays a two-dimensional image, and
a variable lens array disposed to face the display unit,
wherein the variable lens array includes a first substrate having a transparent first common electrode, a second substrate having a transparent second common electrode, and a liquid crystal layer disposed between the first substrate and the second substrate and forming liquid crystal lens columns,
the liquid crystal layer is processed in such a way that liquid crystal molecules are so oriented that each of the liquid crystal lens columns produces refracting power in a state in which no potential difference is present between the first common electrode and the second common electrode, and
a voltage applied between the first common electrode and the second common electrode controls the refracting power of each of the liquid crystal lens columns.

(2) The display apparatus described in (1),
wherein to nullify the refracting power of each of the liquid crystal lens columns, a voltage is applied between the first common electrode and the second common electrode in such a way that the liquid crystal molecules in the liquid crystal layer are oriented in a fixed direction.

(3) The display apparatus described in (1) or (2),
wherein an orientation film is formed on at least one of a surface of the first substrate that faces the liquid crystal layer and a surface of the second substrate that faces the liquid crystal layer, and the orientation film orients the liquid crystal molecules in such a way that each of the liquid crystal lens columns produces refracting power in the state in which no potential difference is present between the first common electrode and the second common electrode.

(4) The display apparatus described in (3),
wherein orientation characteristics of the orientation film is controlled by light irradiation.

(5) The display apparatus described in any of (1) to (4),
wherein a wall-shaped or pole-shaped spacer is disposed at a boundary between adjacent liquid crystal lens columns.

(6) The display apparatus described in (5),
wherein peripheries of the first and second substrates of the variable lens array are sealed by a sealer, and
a gap is present between each end of the wall-shaped or pole-shaped spacers and the sealer.

(7) The display apparatus described in any of (1) to (4),
wherein a wall-shaped or pole-shaped spacer is disposed in a central portion of each of the liquid crystal lens columns.

(8) The display apparatus described in (7),
wherein peripheries of the first and second substrates of the variable lens array are sealed by a sealer, and
a gap is present between each end of the wall-shaped or pole-shaped spacers and the sealer.

(9) A variable lens array including
a first substrate having a transparent first common electrode,
a second substrate having a transparent second common electrode, and
a liquid crystal layer disposed between the first substrate and the second substrate,
wherein the liquid crystal layer is processed in such a way that liquid crystal molecules are so oriented that each liquid crystal lens column produces refracting power in a state in which no voltage is applied between the first common electrode and the second common electrode, and
a voltage applied between the first common electrode and the second common electrode controls the refracting power of each of the liquid crystal lens columns.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display apparatus comprising:

a display unit that displays a two-dimensional image; and a variable lens array disposed to face the display unit, wherein the variable lens array includes a first substrate having a transparent first common electrode that has a plate shape and is formed on a surface of the first substrate, a second substrate having a transparent second common electrode that has a plate shape and is formed on a surface of the second substrate, and a liquid crystal layer disposed between the first common electrode and the second common electrode and forming liquid crystal lens columns, the liquid crystal layer is processed in such a way that liquid crystal molecules are oriented such that each of the liquid crystal lens columns produces refracting power in a state in which no potential difference is present between the first common electrode and the second common electrode, and a voltage applied between the first common electrode and the second common electrode controls the refracting power of each of the liquid crystal lens columns, wherein a wall-shaped or pole-shaped spacer is disposed in a central portion of each of the liquid crystal lens columns.

2. The display apparatus according to claim 1, wherein to nullify the refracting power of each of the liquid crystal lens columns, a voltage is applied between the first common electrode and the second common electrode in such a way that the liquid crystal molecules in the liquid crystal layer are oriented in a fixed direction.

3. The display apparatus according to claim 1, wherein an orientation film is formed on at least one of a surface of the first substrate that faces the liquid crystal layer and a surface of the second substrate that faces the liquid crystal layer, and the orientation film orients the liquid crystal molecules in such a way that each of the liquid crystal lens columns produces refracting power in the state in which no potential difference is present between the first common electrode and the second common electrode.

4. The display apparatus according to claim 1, wherein peripheries of the first and second substrates of the variable lens array are sealed by a sealer, and a gap is present between each end of the wall-shaped or pole-shaped spacers and the sealer.

5. A variable lens array comprising:

a first substrate having a transparent first common electrode that has a plate shape and is formed on a surface of the first substrate;

a second substrate having a transparent second common electrode that has a plate shape and is formed on a surface of the second substrate; and a liquid crystal layer disposed between the first common electrode and the second common electrode, wherein the liquid crystal layer is processed in such a way that liquid crystal molecules are oriented such that each liquid crystal lens column produces refracting power in a state in which no voltage is applied between the first common electrode and the second common electrode, and a voltage applied between the first common electrode and the second common electrode controls the refracting power of each of the liquid crystal lens columns, wherein a wall-shaped or pole-shaped spacer is disposed in a central portion of each of the liquid crystal lens columns.

* * * * *